United States Patent [19]

Daniell

[11] Patent Number: 6,021,826
[45] Date of Patent: Feb. 8, 2000

[54] POWERED CUTTING SAW SYSTEM

[76] Inventor: Stephen S. Daniell, 33 Aldrich St., Northampton, Mass. 01060

[21] Appl. No.: 09/081,007

[22] Filed: May 19, 1998

Related U.S. Application Data

[60] Provisional application No. 60/047,031, May 19, 1997.

[51] Int. Cl.[7] .............................. B27F 5/00; B27M 1/00; B26D 1/46; B27B 17/00
[52] U.S. Cl. ................................ 144/73; 30/371; 30/374; 30/377; 83/830; 83/834; 144/72; 144/36.95; 144/154.5; 144/363; 144/371; 403/292; 403/408.1; 403/298
[58] Field of Search ........................ 83/830–836; 30/371, 30/373, 374, 375, 377, 495; 403/292, 294, 298, 408.1; 144/72, 73, 136.95, 154.5, 363, 368

[56] References Cited

U.S. PATENT DOCUMENTS

| | | | |
|---|---|---|---|
| 1,170,120 | 2/1916 | Slonaker | 144/72 |
| 1,892,246 | 12/1932 | Mohns | 144/73 |
| 3,038,509 | 6/1962 | Forward . | |
| 3,878,607 | 4/1975 | Ehlen et al. . | |
| 3,903,774 | 9/1975 | Stinson . | |
| 4,143,460 | 3/1979 | Shean . | |
| 4,272,889 | 6/1981 | Scott et al. . | |
| 4,309,931 | 1/1982 | Alexander . | |
| 4,382,334 | 5/1983 | Reynolds | 144/73 |
| 4,464,964 | 8/1984 | Alexander . | |
| 4,514,125 | 4/1985 | Stol . | |
| 4,562,761 | 1/1986 | Alexander . | |
| 4,592,401 | 6/1986 | Vanago . | |
| 4,615,654 | 10/1986 | Shaw | 144/136.95 |
| 4,681,477 | 7/1987 | Fischer . | |
| 4,813,323 | 3/1989 | Harfst . | |

(List continued on next page.)

FOREIGN PATENT DOCUMENTS

| | | |
|---|---|---|
| 0 358 112 | 3/1990 | European Pat. Off. . |
| 0 549 561 | 6/1993 | European Pat. Off. . |
| 722 595 | 3/1932 | France . |
| 653906 | 12/1937 | Germany . |
| 740965 | 11/1943 | Germany . |
| 918536 | 9/1954 | Germany . |
| 3211627 | 11/1983 | Germany . |
| 3607010 | 9/1987 | Germany . |
| 165565 | 11/1933 | Switzerland . |

OTHER PUBLICATIONS

International Search Report issued from International Application No.: PCT/US 98/10209 mailed Sep. 16, 1998.
John D. Wagner, "Choosing The Strongest Joinery For Doors", Mar./Apr. 1995.
3,744,540, Serial No. 199959, Charles E. Wirch, "Multi-Mortising Machine", issued Jul. 10, 1973.
Sven Hanson, "Are More Biscuits Better?", pp. 110–112, Fine Woodworking, (Publication date not known).
Duo–Fix 2 catalog pages. (Publication date not known).
Hoffman / System FESTO 4 catalog pages. (Publication date not known).
The Lamello system 15 pages. (Publication date not known).

*Primary Examiner*—W. Donald Bray
*Attorney, Agent, or Firm*—Wolf, Greenfield & Sacks, P.C.

[57] ABSTRACT

A plate-joinery system includes a chain-saw plate joiner where the cutting mechanism includes a cutting-chain driven about a saw-bar. The cutting mechanism of the chain-saw plate joiner may be advanced on rails to one of a set of predetermined depths. The increased recess depth allowed by the chain-saw and the resultant increase in both glueable surface area and mechanical engagement permit high-strength right-angle joints to be made with the speed of conventional plate-joinery. Plate-joints of more conventional proportion may also be made. The plate joinery system also includes specialty plate configurations and compatible fasteners that permit many joints to be rapidly assembled without resort to either manual glue application or external clamps. A series of high-precision, low-friction cutting devices suitable for general introduction is also described.

43 Claims, 21 Drawing Sheets

U.S. PATENT DOCUMENTS

| | | |
|---|---|---|
| 4,822,202 | 4/1989 | Gustafason . |
| 4,887,357 | 12/1989 | Alexander . |
| 4,911,050 | 3/1990 | Nitschmann . |
| 4,913,204 | 4/1990 | Moores et al. . |
| 4,942,912 | 7/1990 | Gakhar et al. . |
| 4,995,852 | 2/1991 | Takahashi et al. . |
| 5,257,654 | 11/1993 | Bean et al. . |
| 5,381,595 | 1/1995 | Keith, Jr. et al. . |
| 5,413,158 | 5/1995 | Wirth, Jr. et al. . |
| 5,458,433 | 10/1995 | Stastny . |
| 5,706,874 | 1/1998 | Brazell et al. ...................... 144/136.95 |
| 5,875,826 | 3/1999 | Glousos ............................... 144/154.5 |

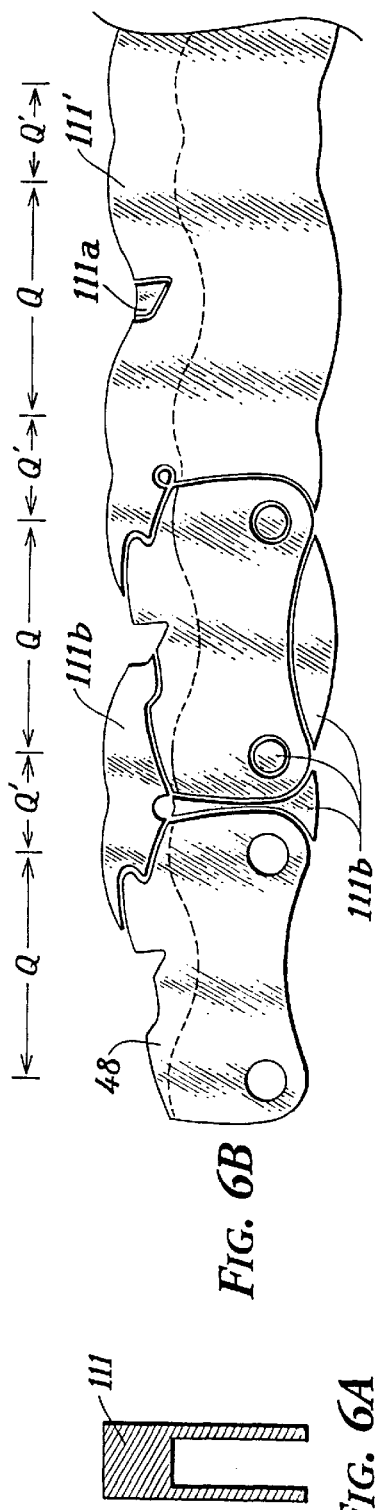
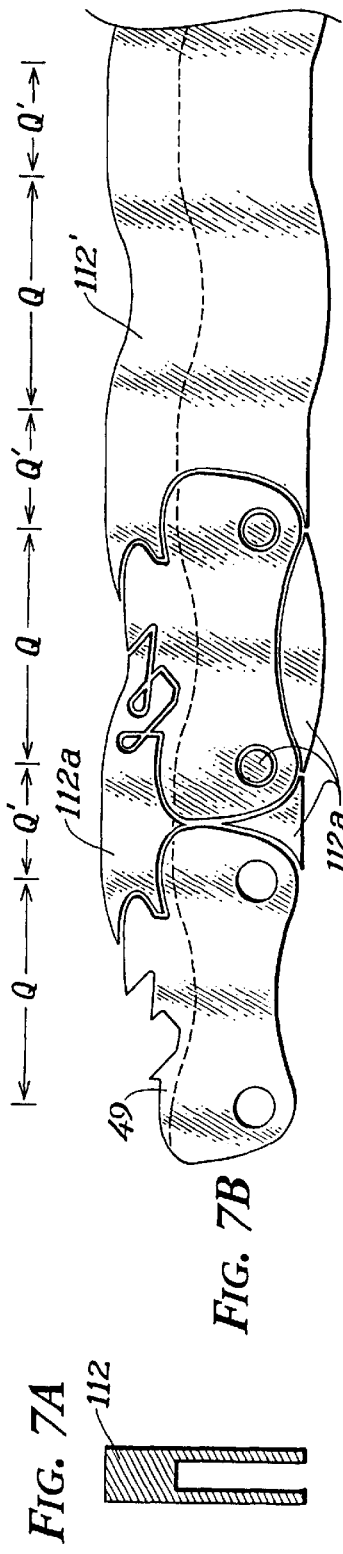
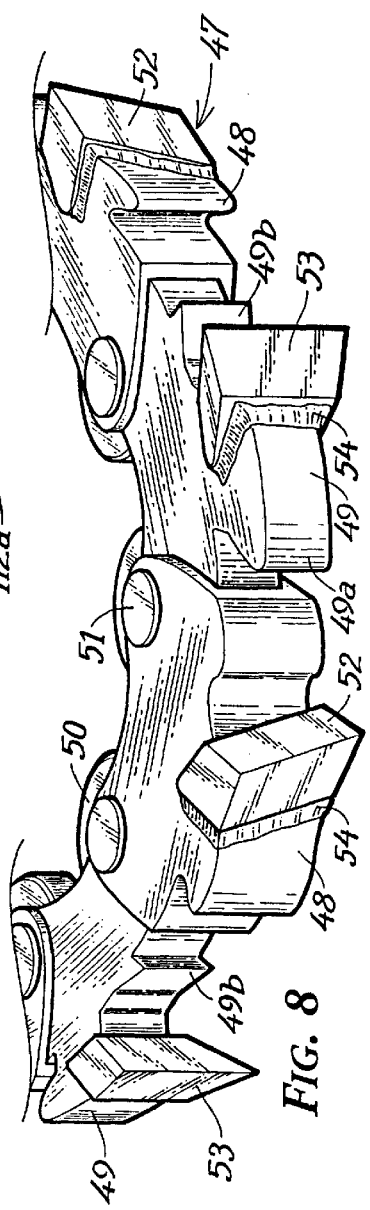

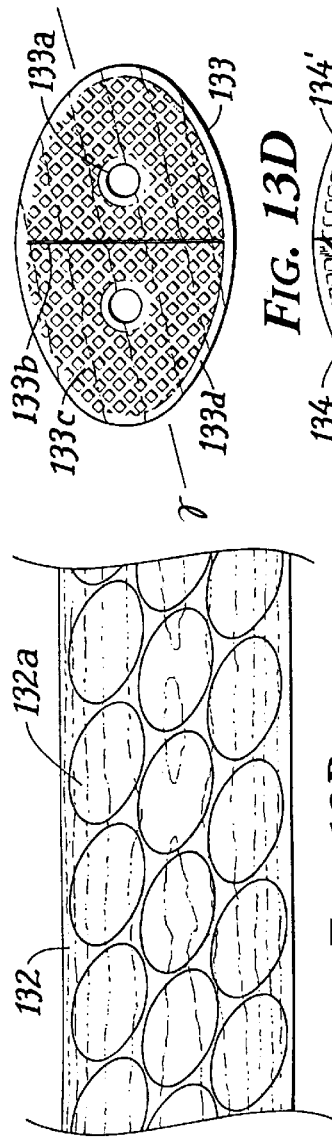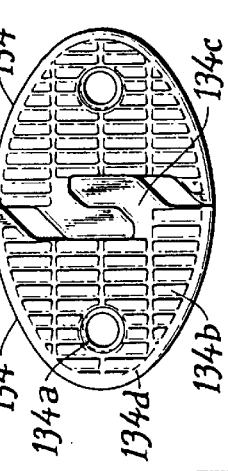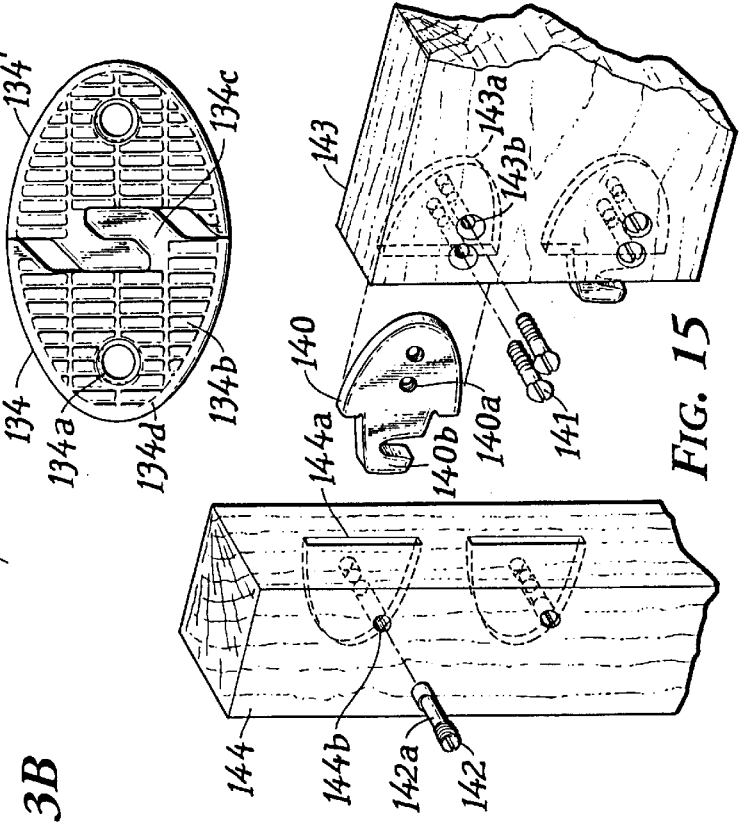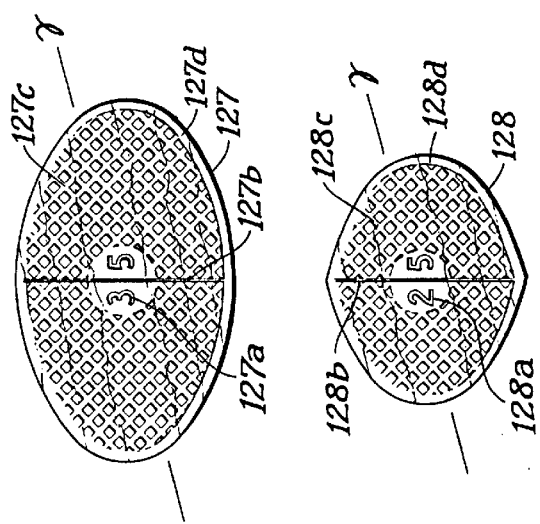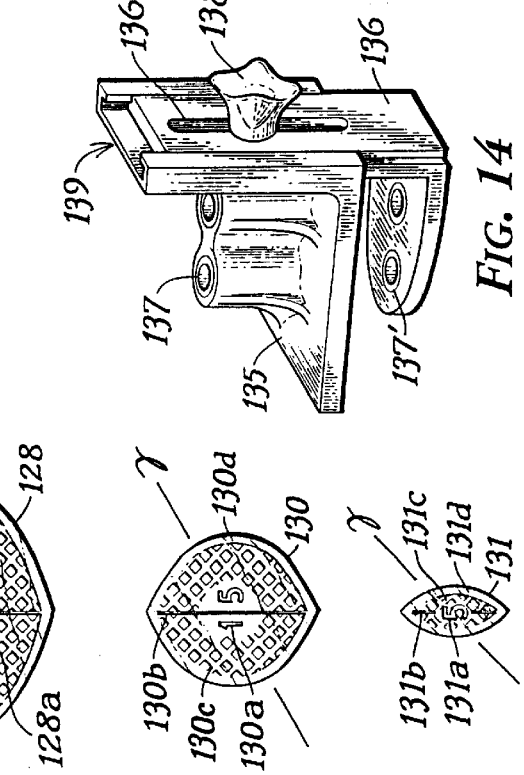

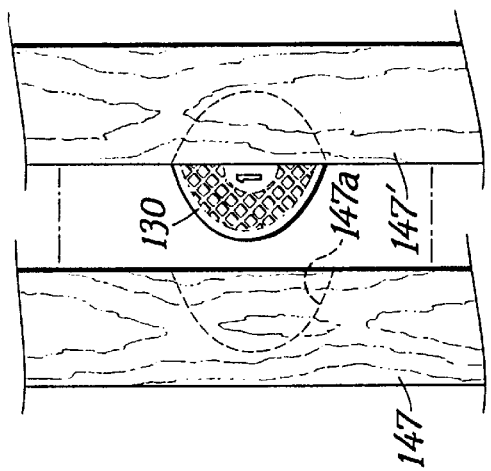
FIG. 16C
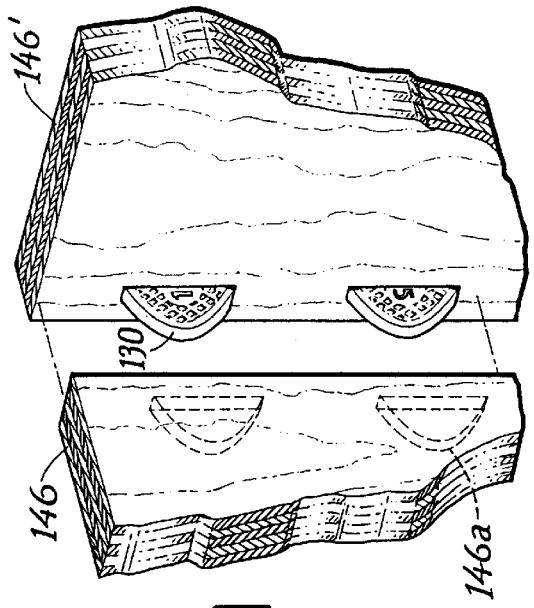
FIG. 16B
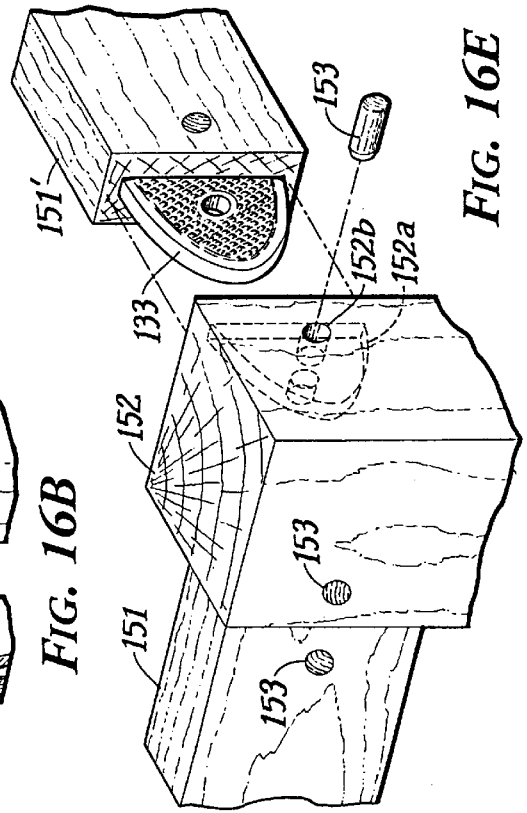
FIG. 16E
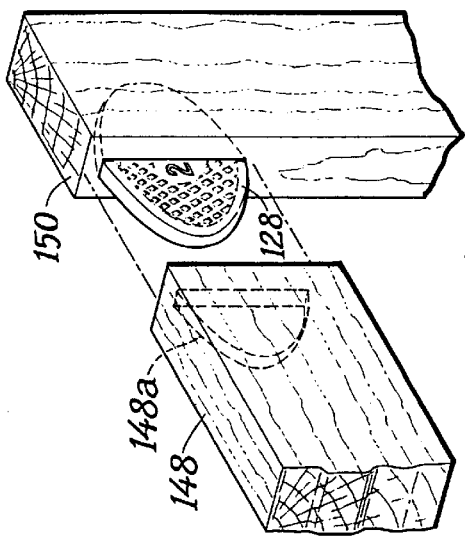
FIG. 16D
FIG. 16A

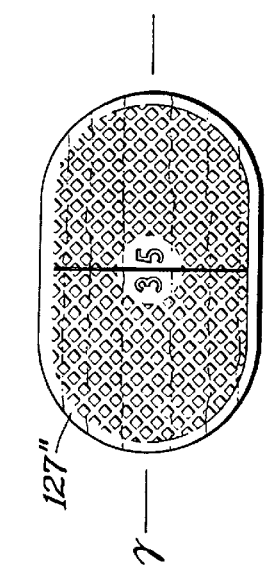
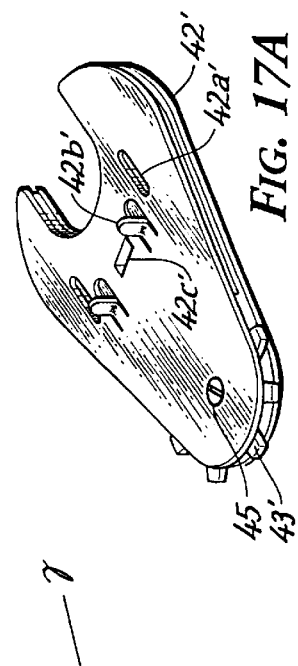
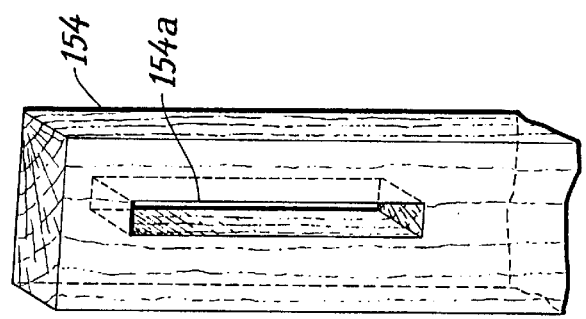
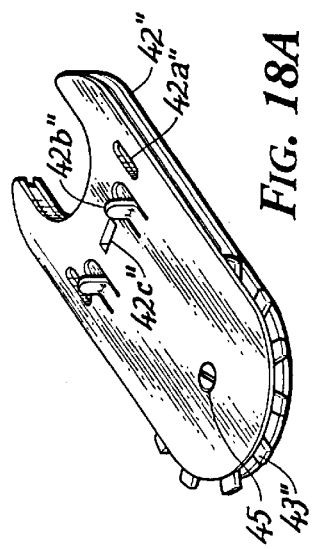
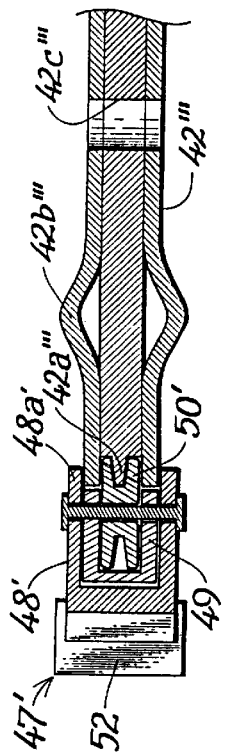
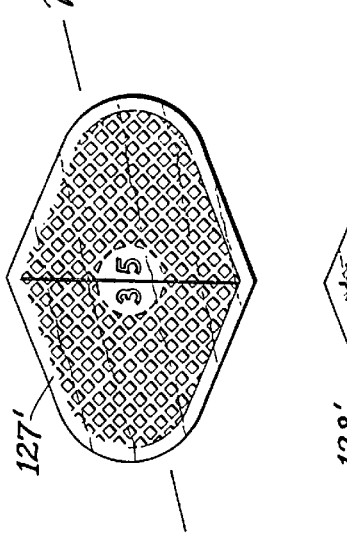
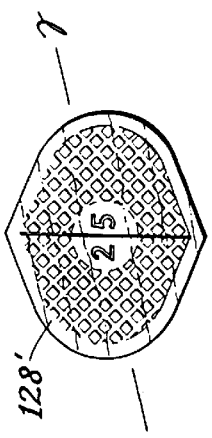

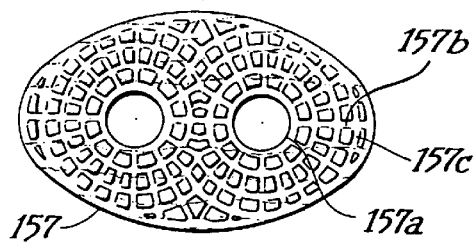
FIG. 20
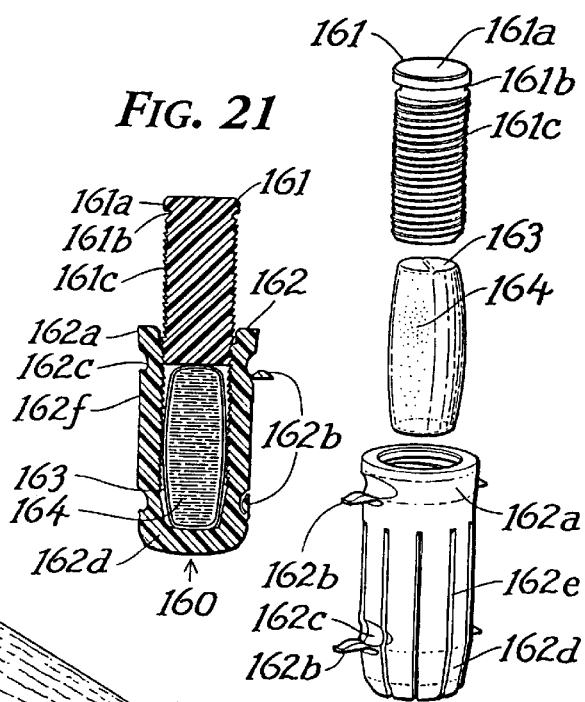
FIG. 21
FIG. 22
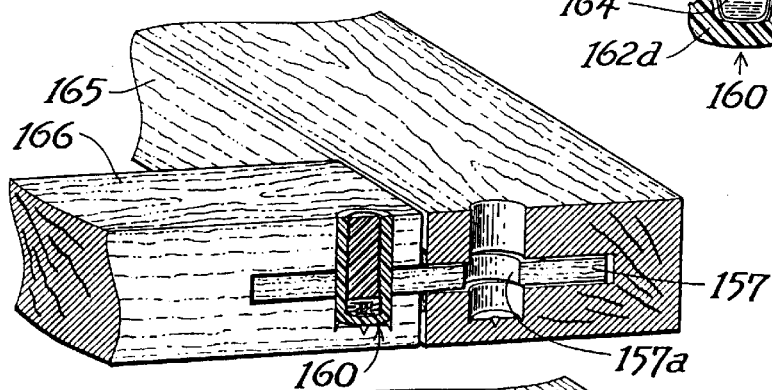
FIG. 23A
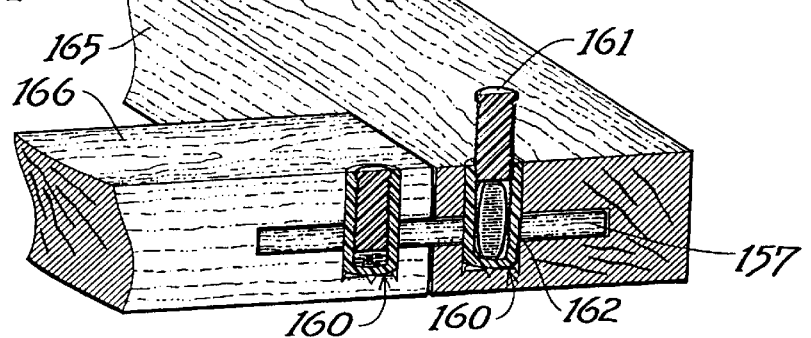
FIG. 23B
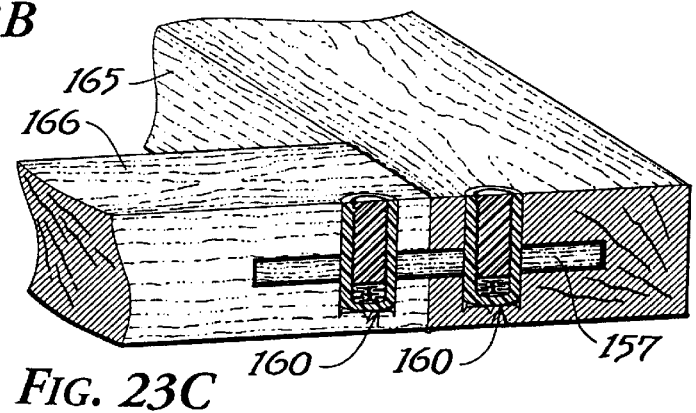
FIG. 23C

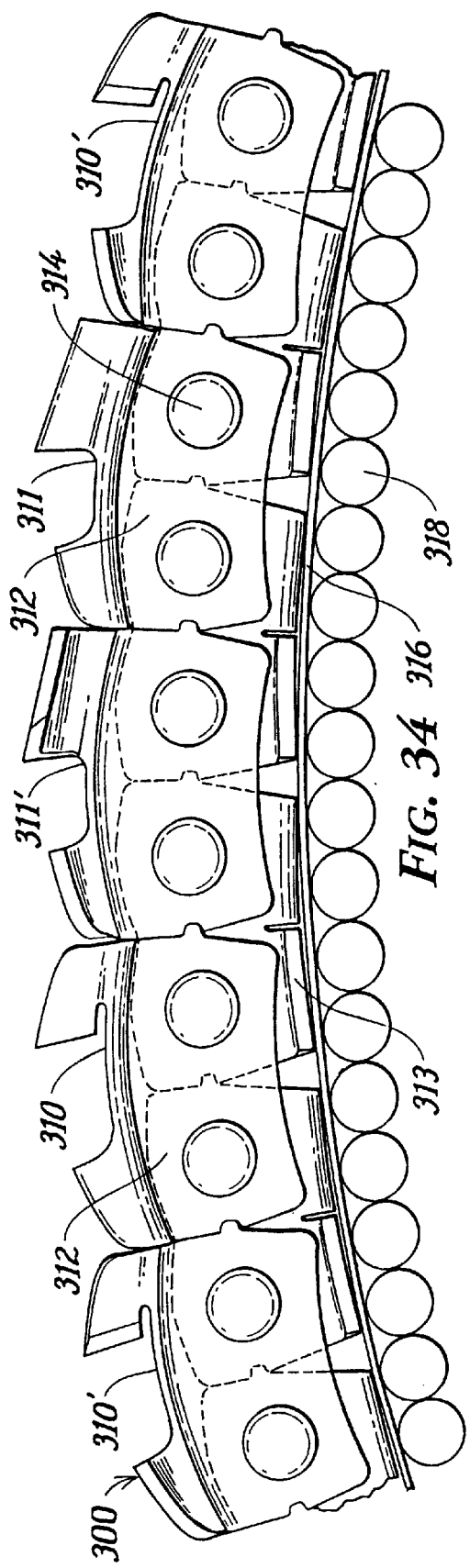
FIG. 34
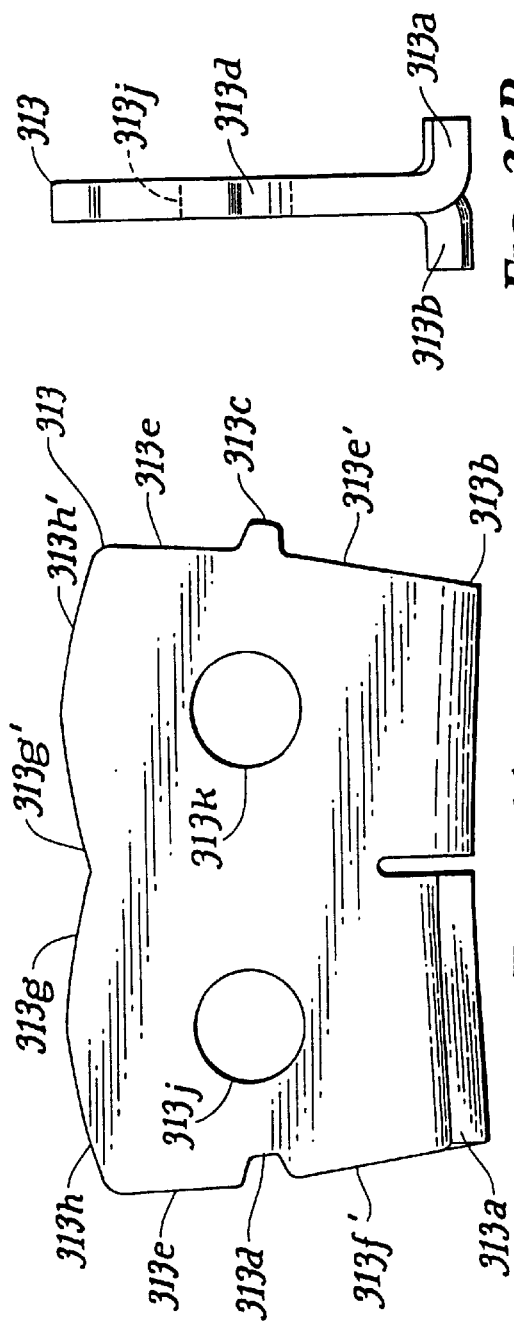
FIG. 35A
FIG. 35B

POWERED CUTTING SAW SYSTEM

BACKGROUND OF THE INVENTION

This application claims priority under 35 U.S.C.§ 119 (e) to commonly-owned, co-pending U.S. provisional patent application serial No. 60/047,031 entitled "Chain-Saw Plate Joinery," filed May 19, 1997, which is incorporated herein by reference in its entirety.

FIELD OF THE INVENTION

The present invention pertains to the fields of plate-joinery and fastening, and more particularly is directed to forming and assembling joints in wood and other materials using a powered cutting saw.

DISCUSSION OF THE RELATED ART

Five thousand years ago, the throne of Egyptian king Tutankhamen was assembled using mortise-and-tenon joints pinned in place with dowels. Ancient Greek shipwrights assembled hulls by drilling holes and cutting mortises in abutting planks, inserting a drilled plate in the mortises, and driving a dowel home through slightly offset holes to draw the planks tight. The draw-tenon, as this joint is known, is now used only by a small group of traditional artisans, mainly in post-and-beam timber-framing and in the reproduction of historical furniture.

Some components of the draw-jointing process have been mechanized. Mortise-and-tenon joints, for example, were originally cut entirely by hand; while the tenon has been relatively easy to reproduce by mechanical means, the mortise has remained problematical. Swing-arm and oscillating mortising machines, essentially power-driven versions of the manual task, are massive, costly, and are difficult to sharpen and maintain.

In hollow-chisel mortisers, a hollow bit of square cross-section is forced into the material, while a rotating conventional helical bit within bores out the greater part of the waste. A succession of such square holes approximates a mortise. The friction induced by driving the hollow-chisel in such a fashion, however, often causes the bit to overheat and jam at the bottom of the cut; the subsequent force of extraction often causes the wood surface to be damaged, wasting both time and material. A further error seen in mortises cut by this method shows itself as an unintended staggering of successive square holes. These and other shortcomings have caused the hollow-chisel mortiser to lapse from general use.

Spindle-mortisers and motor-driven plunge-routers both cut mortises with rounded ends. Both remove only a small amount of material with each pass; ten or more passes may thus be required to cut a single mortise. Furthermore, these machines must be adjusted after each pass is made, increasing both the manufacturing time and the likelihood of error. Functionally similar plunge-routers suffer from a particular type of error where movement of the router, or inaccuracies in its sleeve bearings, cause the router to create a stepped side-wall. If this is not corrected by hand-work, the assembled joint is severely weakened.

Chain-saw mortisers cut mortises by plunging a bar carrying a moving cutting-chain into the wood in a "nose-cutting" operation. The results are generally rough, however, unless great care is taken in the set-up and regular adjustment of a brace at the exit-point of the cutting-chain. Chain-saw mortising is therefore largely confined to timber-flaming, where precision is secondary, and high-production architectural millwork, where set-up costs are offset by production economies. The chain-saw mortiser has been in use nearly as long as the chain-saw; and the design has remained unchanged for half a century.

The preponderance of manufactured furniture today is therefore assembled with dowels, despite the fact that doweled joints rate poorly in both mechanical and adhesive strength. Doweled joints expected to encounter significant structural loading or deflection force are generally reinforced with wooden corner-blocks or metal hardware. Despite these precautions, doweled joints often fail in everyday use.

A relatively recent development, the plate-joining machine, has proven highly effective in quickly producing reliable splined connections where sheet goods, long-grain edges, or large miters are to be joined. The mortises formed are typically shallow and some joints assembled in this manner, such as right-angle joints, are therefore suited only to light use. In plate joinery, a compressed wooden spline inserted in recesses of corresponding shape is used to align and connect two parts. The application of a water-based adhesive causes the compressed plate to swell and bind against the side-walls of the recesses. A contemporary version of a plate or biscuit joiner, for example, is shown by Moores and Price in U.S. Pat. No. 4,913,204.

Scott and Gibson, in U.S. Pat. No. 4,272,889, disclose a circular saw adapted to chain-sawing that permits nose-cutting. The motor and chain-saw slide along a guard-bar assembly and may be engaged in the stock in a nose-cutting operation. The moving cutting-chain is largely exposed and the considerable weight of the circular saw type motor is carried asymmetrically above the small bearing surface of the nose-guard loop. There is no provision for aligning the mortise with the stock; such alignment is made subjectively by the operator, or an external jig or other positioning device is used. Devices such as the circular saw adapted to chain-sawing are generally used for relatively rough operations, such as timber-framing.

Because the cutting chain bears directly against the saw-bar, conventional cutting-chains require constant lubrication in order to operate freely; even so, the amount of tension which may be introduced to the chain is limited. An over-tensioned blade will overheat and cause erosion of the saw-bar; an under-tensioned blade is inaccurate because of its excessive play, and may even escape the bar entirely. The pattern of wear in the saw-bar is often asymmetrical, causing the chain to ride in a canted or wandering fashion about the saw-bar. Because the metal of a conventional cutting-chain rides directly on the saw-bar under tension, conventional chain-saws are unsuitable for applications which require accurate repetition, such as plate-joinery.

Chain-saw sprockets positioned at the nose of the saw-bar have proven effective in reducing friction in that high-stress area, and are used in nose-cutting devices such as chain-saw mortisers. In such systems, only those teeth that are momentarily mounted on the nose-sprocket cut; teeth traveling along the length of the bar serve only to remove waste. Conventional chains reflex, kink, and jam when induced to traverse an open span under plunging forces; such spans are encountered on the sides of the bar where the chain is transferred from the bar to the sprocket, and vice versa. Therefore, bars employed for chain-mortising, unlike those for timber-cutting, have parallel sides.

In a series of cutting-chains shown by Alexander, in U.S. Pat. Nos. 4,309,931, 4,464,964, and 4,562,964, links abut one another so that the chain may not be reflexed; the articulation of the chain is arrested when a set of links is arrayed in a straight line. The cutting-chain may thus span concavities in the profile of a straight-sided saw-bar. These cutting chain designs are not suited to nose-cutting; first, because the links expose large gaps as they conform to the nose-sprocket, the chain rapidly accumulates a disabling amount of waste; second, because the cutting-links are formed having linear arrays of multiple cutting-teeth, the teeth almost entirely fail to contact a workpiece in a nose-cutting operation.

The need for external clamping devices has long been considered a cumbersome requirement of the process of assembling wood products. Self-closing DUO-FIX™ fasteners (Häfele) have recently been introduced for use with conventional plate-joiners. The reliable use of the fastener requires plate halves to first be adhered in place and then allowed to set; only then may the full closure of the joint reliably be accomplished. Other systems which employ plates or splines of unconventional shape are shown by Vanago, in U.S. Pat. No. 4,592,401, and Stastny, in U.S. Pat. No. 5,458,433. Vanago describes various splines to be used in a miter-cutting device, and Stastny shows an octagonal plate which accommodates glue excess for use with a router equipped with a slotting-cutter. Both of these systems require external devices for clamping.

Other types of fasteners are disclosed by Gustafson, in U.S. Pat. No. 4,822,202, and Fischer, in U.S. Pat. No. 4,681,477. Both patents show a double-ended dowels with an enclosed dose of adhesive. Fisher shows a discrete glue capsule which is first installed in a hole and then punctured by the pointed end of a specially-devised dowel. Gustafson incorporates a glue reservoir in a hollow of the dowel.

SUMMARY OF THE INVENTION

Embodiments of the present invention permit the formation of recesses deeper than those provided by plate-joiners currently known in the trade, thus allowing plates of greatly increased penetration and surface area to be employed. Embodiments of the present invention also permit many structural shortcomings, operational errors and procedural inefficiencies seen in previously employed techniques of right-angle joinery to be overcome. The speed of machine and work piece set-up and joint formation is increased, and the variety of form and scale of joints is also increased. Moreover, embodiments of the present invention are more portable, consistent, safe, and easy-to-use than comparable systems and methods of joinery. In addition, clamping, adhesive handling, and machine maintenance are minimized.

In one embodiment of the present invention, a device is provided which combines the deep-mortising ability of a cutting-chain with the speed, safety and convenience of a plate-joinery system. Compared to conventional modifications of chain-saws for mortising applications, embodiments of the present invention provide significant protection from accidental contact with the cutting mechanism. A relatively small but precise cutting-chain is fitted around a saw-bar of oblong profile. The chain is driven around the bar by a rotating sprocket. Rotational force is provided to the sprocket by a motor equipped with a right-angle transmission, and the powered chain-saw subassembly is mounted so that it may slide on an independent base. This sliding carriage is directed and retained by flanged rails or tracks on the base. The base includes means to eject waste, means to safely house the cutting-chain, means to prevent lateral displacement of the plate-joiner during the cutting operation, means to adjust the depth of the cut, and means to variously align the plate-joiner with the work-piece. A self-adjusting throat braces the workpiece at the exit-point of the cutting-chain and minimizes tearout.

The travel of the saw subassembly on the base is limited at both ends of its travel. Spring tension is introduced between the base and the carriage so that the cutting elements are normally retained in a retracted, enclosed position. Such tension has traditionally been induced by springs of the extension or compression type, both of which produce increasing resistance as the operator proceeds with a cut. However, in one embodiment of the present invention, a wound spiral spring is used to provide near-constant force as measured over the linear relative motion of the base and carriage. Operator fatigue and accidental marring of the work-piece due to excessive spring resistance are thereby avoided.

In another embodiment of the present invention, a cutting-chain is provided rides on rollers rather than bearing directly on the saw-bar. The resultant reduction in friction allows higher chain tensions to be employed while circumventing saw-bar errors induced by wear and thermal deformation. Because the chain rotates around the bar on bearings, methods of lubrication that are traditionally used in chain-saws are unnecessary. This, in turn, avoids contaminating the work-piece with the lubricant, thus obviating removal of the contaminant from the work-piece prior to glueing or finishing. The design of the chain also permits it to span gaps in the bar without reflexion. According to a further embodiment, the chain includes various structures to deter the intrusion of waste into chain interstices. These and other design elements increase the accuracy of the cutting-chain so that it provides the consistency necessary for plate-joinery. In accordance with the conventions with wood-cutting-tools, versions of the cutting-chain appropriate for use with both brazed carbide inserts and monolithic, high-speed steel plate stock are described.

According to another embodiment of the present invention, an adjustable drilling guide is provided whereby holes may be precisely formed through the recesses of the drilling guide without risk of tearout. Guide bushings in the drilling guide guarantee that perpendicularity is maintained. Plates are provided in a variety of expressly-devised sizes and shapes, and are most commonly composed of compressed dehydrated hardwood. One or more holes may be provided in a plate to permit draw-joining. Dowels may be provided in conventional solid form. However, in a further aspect of the present invention, a two-part fastener is provided that encloses a dose of adhesive. In one embodiment, the fasteners are expressly devised to discharge adhesive into the interior of the plate-joint while concurrently drawing the joint closed.

In one embodiment of the joining process, identical cuts are made in two pieces of stock using the chain-saw plate-joiner. Holes are formed which traverse the plate-recesses in the joint, using the drill-guide for accurate location. A preformed plate is provided corresponding generally in shape to the void formed by the two abutted recesses; holes are included in the plate so that when the plate is inserted in the recesses, the longitudinal axes of the holes in the plate are slightly offset, in the direction of the joint, from the longitudinal axes of the holes formed through the recesses. This arrangement ensures that the joint will be drawn closed under pressure. A two-part fastener is installed in the hole by the force exerted on the top rim of the outer sleeve. A second action drives the plunger into the sleeve, drawing the plate fully into the recess while simultaneously discharging adhesive into the joint. This procedure is repeated with the other half of the joint, with the result that the remaining half of the joint is irrigated with adhesive, the plate placed in tension within the joint, and the gap drawn closed under pressure.

BRIEF DESCRIPTION OF THE DRAWINGS

Preferred, non-limiting embodiments of the present invention are described by way of example with reference to the accompanying drawings, in which:

FIG. 6A is a transverse section of the outer channel-stock of a cutting chain according to an embodiment of the present invention;

FIG. 6B illustrates a process for cutting the convoluted outer channel-stock of a cutting chain into links;

FIG. 7A is a transverse section of the inner channel-stock of a cutting chain according to an embodiment of the present invention;

FIG. 7B illustrates a process for cutting the convoluted inner channel-stock of a cutting chain into links;

FIG. 8 shows a section of assembled chain;

FIG. 13A shows a series of wood plates;

FIG. 13B shows a wood plate layout pattern;

FIG. 13C shows a plate for use with draw-pins;

FIG. 13D shows a plate for use as a repeated-use fastener;

FIG. 14 shows a drill-bit guide for use with the plate-joiner of the present invention;

FIG. 15 shows a heavy-duty repeated-use fastener;

FIG. 16A shows a partially-assembled miter-joint according to the present invention;

FIG. 16B shows a partially-assembled right-angled plywood butt-joint according to the present invention;

FIG. 16C shows a partially assembled long-grain edge-joint according to the present invention;

FIG. 16D shows a partially-assembled face-frame joint according to the present invention;

FIG. 16E shows a partially-assembled leg-to-rail joint using draw-pins in the manner of the present invention;

FIG. 17A shows a modified saw-bar having a linear taper in accordance with an embodiment of the present invention;

FIG. 17B shows a series of wooden plates for use with the saw-bar shown in FIG. 17A;

FIG. 18A shows a modified saw-bar having parallel sides in accordance with a further embodiment of the present invention;

FIG. 18B shows a spatulate wooden plate for use with the saw-bar shown in FIG. 18A;

FIG. 18C shows a through-mortise formed with the bar shown in FIG. 18A;

FIG. 19 is a sectional view showing further modifications of the saw-bar in accordance with an embodiment of the present invention;

FIG. 20 is a plate modified for use with glue-filled dowels;

FIG. 21 is a sectional view of a dowel carrying encapsulated adhesive;

FIG. 22 is an exploded view of the dowel of FIG. 21;

FIG. 23A is a partial section of a half-assembled draw-joint employing the plate and dowel of the FIGS. 20–22;

FIG. 23B is a partial section showing the first phase of the closure of the draw-joint;

FIG. 23C is a partial section showing the completed draw-joint;

FIG. 34 shows a modified chain in which the chain rides on rollers;

FIG. 35A shows a footed internal link of the cutting-chain of FIG. 34;

FIG. 35B is an end-view of the link of FIG. 35A showing the laterally bent feet;

DETAILED DESCRIPTION

According to an embodiment of the present invention, a joinery system is provided that includes a line-powered, portable, chain-sawing plate-joiner. The chain-saw assembly slides on machined rails so that the nose of the chain-saw may be engaged in the stock in a precise and controlled manner. The chain-saw plate-joiner includes means to variously limit the cut at a fixed number of predetermined depths. It further includes a linkage which adjusts the width of the throat as the cut proceeds, so that the effect of a zero-clearance throat opening is produced throughout the cutting action. In one embodiment, the chain-saw plate joiner includes integral external gear-racks so that the plate-joiner may be used in an expressly devised mounting in addition to being used as a stationary device.

Figure 1A:
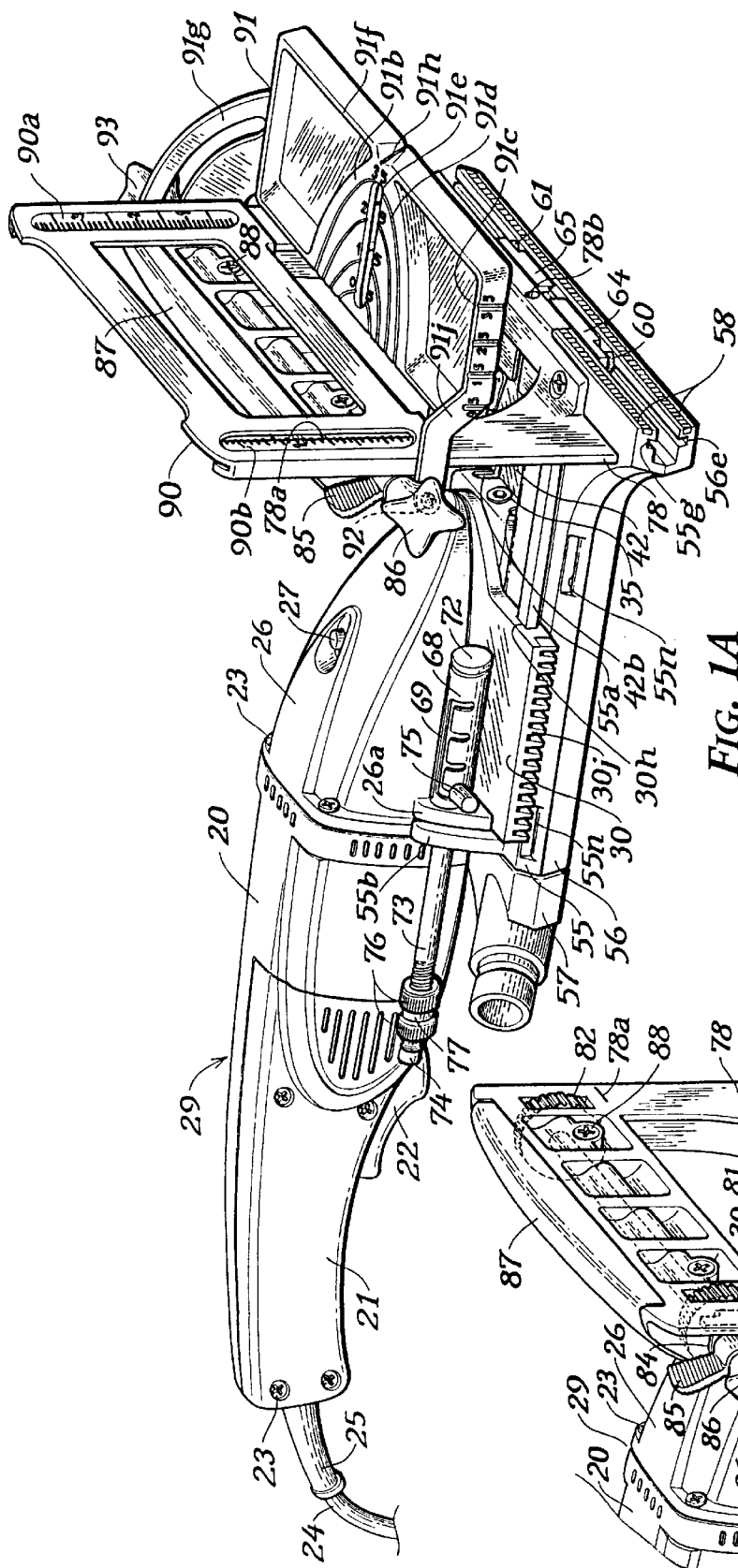
FIG. 1A is a perspective view, in a retracted position, of a chain-saw plate-joiner according to an embodiment of the present invention.
Figure 1B:
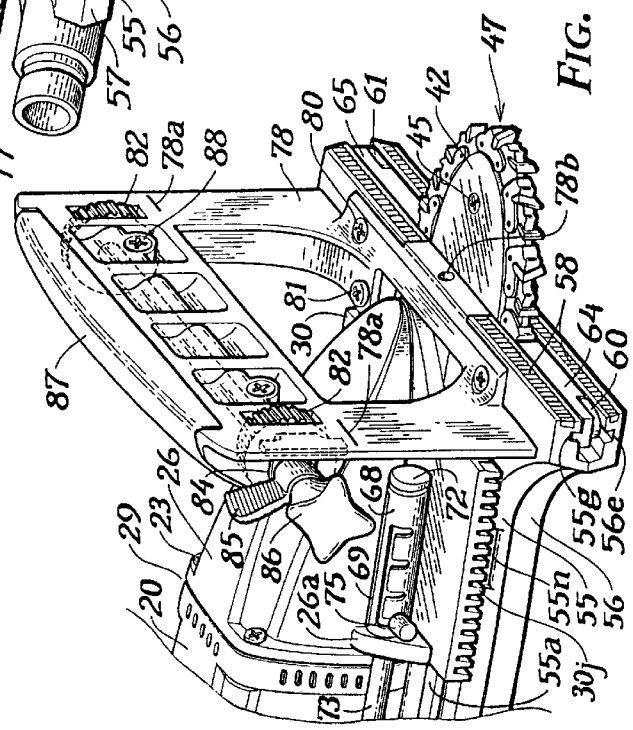
FIG. 1B is a perspective view of the chain-saw plate-joiner of FIG. 1A in a fully extended position, with the fence and fence carriage removed.
Figure 2:
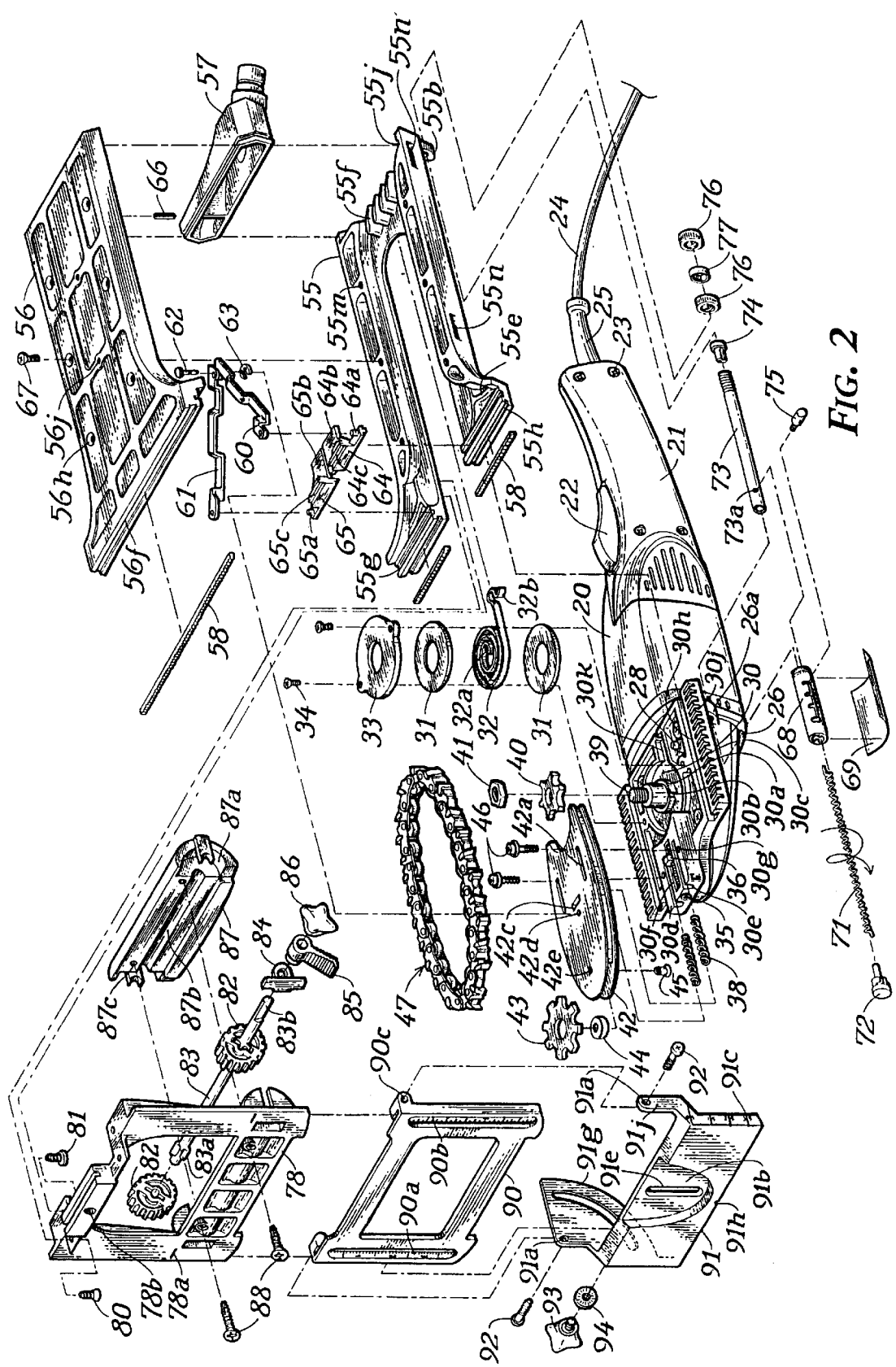
FIG. 2 is an exploded view of components of the chain-saw plate-joiner of FIGS. 1A and 1B.

FIGS. 1A and 1B illustrate two perspective views of outward aspects of an assembled plate-joiner according to an embodiment of the present invention. FIG. 2 is an exploded view of the device from the underside. In descriptions of the chain-saw plate-joining machine described herein, designations of handedness refer to the operator's right and left, and do not necessarily coincide with the orientations in the drawings. Similarly, indications of verticality and horizontality refer to the presumed placement of the base of the plate-joiner on a horizontal plane. An exception to these referents occurs in the case of the cutting-chains, in which right and left are differentiated by the convention of an observer looking toward an upright section of chain, with the sharpened teeth uppermost and facing the observer.

FIG. 1A shows the chain-saw plate-joiner 29 in its at-rest or retracted position. The plate-joiner includes motor housing 20 and motor housing access panel 21 of molded thermoplastic material. The access panel retains trigger-type momentary switch 22, power cord 24, and strain-relief sleeve 25, and is secured to the motor housing using pan-head assembly screws 23. Cast-metal transmission housing 26 is attached with assembly screws to the front of the motor housing, and includes integral depth-stop mount 26a. Spindle-lock 27 protrudes through a hole in the top of the housing. Chain-saw carriage-plate 30 is attached from underneath to the transmission housing. Milled undercut slot 30h in the chain-saw carriage-plate is engaged with milled carriage rails 55a in upper saw housing 55 in such a way that the motor assembly may slide along a limited linear path. Integrally cast gear-racks 30j occupy an overhanging extension on either side of the carriage, and are oriented with their gear-teeth facing downward. Right and left gates 64, 65, respectively, are shown in the closed position in FIG. 1A.

The gates are driven by right and left linkage-arms 60, 61, and slide laterally and oppositely in upper and lower milled gate tracks 55g, 56e in upper and lower saw housings 55, 56.

Fence armature 78 is mounted with armature-mounting flat-head screws 80 and pan-head screws 81 to the upper saw-housing. Molded grip 87 is mounted to the armature using attachment screws 88 installed in grip mounting-holes 87c. The armature's outer flanges serve as guides for the vertical travel of fence carriage 90. Fence-height indicator lines 78a are incused horizontally in two locations on the front surface of the armature. Scales are provided on the fence carriage in metric 90a and English 90b measurements. These scales include elongate openings which visually intersect the fence-height indicator lines. Fence-height adjustment knob 86 and fence-height draw-cam lever 85 are located at the height of the molded grip on the operator's right. Fence 91 is connected to the fence carriage by fence-retaining shoulder screws 92 inserted through fence pivot holes 91a, fence hinge-arm 91j and fence protractor 91g into threaded fence-mounting holes 90c. The fence may thereby be rotated about a transverse axis. The threaded shank of protractor locking knob 93 is inserted through an arcuate slot in fence protractor 91g into a threaded hole in fence carriage 90. The fence further includes fence blade-housing 91b of sufficient dimension to house the fully extended chain-saw, and cutting-depth indicia 91c, 91d on the side and top of the fence, respectively. The blade housing includes progress window 91e in the form of an elongate hole. Finger-stop 91f creates a ridge across the front edge of the fence. Fence alignment mark 91h bisects the front edge of the fence, and is beveled on both sides so as to be readily visible to the operator.

Slotted and notched depth-setting sleeve 68 includes external threads at one end and internal threads at the other. The externally-threaded end is screwed into depth-stop mount 26a, which extends from the transmission housing. Sleeve cap 72 and sliding-bolt cap 74 are installed in a manner best understood by reference to the exploded view shown in FIG. 2. Twist-spring 71 includes straight longitudinal extensions at either end which correspond to holes in the caps. The caps further include L-shaped bayonet-type channels, with the L-shaped channels having opposite orientations. Bent tabs in the depth-setting sleeve and the sliding-bolt engage in these channels and lock by rotation. During assembly of the depth-stop mechanism, torsional force is induced in the twist-spring in the direction indicated by the arrow. The twist-spring is oriented so that the torsion induces a reduction of the spring diameter rather than an expansion. Locking-pin 75 is subsequently installed through the notched slot in depth-setting sleeve 68 and into threaded locking-pin hole 73a in sliding-bolt 73. As the sliding chain-saw assembly is engaged with milled carriage rails 55a, the sliding-bolt assembly is fed through a hole in depth-stop 55b. Knurled nuts 76 equipped with an intermediate spacer 77 of resilient material are then installed on the sliding bolt to limit the forward motion of the chain-saw assembly, and permit subsequent fine adjustment of the depth-setting. The sliding-bolt may thus be electively relocated to a predetermined number of settings equal to the number of notches in the depth-setting sleeve. These settings are identified by alphanumeric indicia printed on decal 69. The twist-spring's tendency to recover its stable form induces torsional force in such a way that the bayonet-mounted caps and the sliding-bolt assembly are self-locking. This self-locking attribute discourages vibration-induced dislocation or disassembly during operation of the plate-joiner.

As shown in FIG. 1A, saw-bar 42 and cutting-chain 47 are fully enclosed in upper and lower saw-housings 55, 56. Right and left guard-plates 64b, 65b are formed integrally in gates 64, 65 and cover the exposed nose portion of the chain-saw assembly. Tensioning-wrench access hole 78b is provided so that saw-bar retraction screw 35 may be adjusted with a hexagonal wrench. Bent tabs 42b are visible on the top surface of saw-bar 42 and contribute to the tensioning of the cutting-chain; the tensioning process will be hereinafter described in greater detail.

Waste deflection and recovery is provided for by dust-collection chute 57 which ejects particulate waste at an oblique angle on the operator's right. Provision for optional stationary mounting of the plate-joiner, which will be described hereinafter, is made by stationary-mount draw-clasp recesses 55n in the upper saw-housing.

FIG. 1B shows the front of the plate-joiner in its extended position. The fence assembly and a presumed work-piece are not shown. Gates 64, 65 are in their outermost position, revealing extended saw bar 42 and cutting-chain 47. Nose-sprocket axle screw 45 is installed through the top layer of the saw-bar and threaded into the bottom layer. The gates have been driven to their outermost position by the linkage-arms. Ribbed-rubber friction-pads 58 are located above and below the gate tracks. The rubber pads are installed in upper and lower friction-pad recesses 55h, 56f in the faces of the saw-housings, such that the ribs stand slightly proud of the metal surface. This installation may be seen in the exploded view in FIG. 2.

The workings of the fence assembly may be best understood by concurrent reference to FIG. 1B and FIG. 2. FIG. 2 reveals enclosed fence-adjusting gear-axle 83, which turns freely in abutted two semi-cylindrical ways formed integrally in cast front armature 78 and molded grip 87. Fence-adjusting gear-axle way 87b and fence-adjusting spur-gear recess 87a are formed integrally in the grip. The armature casting includes substantially symmetrical recesses. The grip is attached to the armature by two flat-head grip-attachment screws 88 inserted through holes in the front of the armature. Fence-adjusting spur-gears 82 are engaged with the fence gear-axle via spatulate boss 83a, seen in FIG. 2. The spur-gears protrude partially through the front face of the armature. The end of the axle on the operator's right extends through the armature on that side. Fence-height locking-plate 84 is fit over the gear-axle. The fence-height locking-plate includes a right-angle extension, which rests in a recess of complementary shape in the rear surface of the armature. Fence-height draw-cam lever 85 includes a hole slightly larger than the diameter of the fence gear-axle, so that it may be mounted on the axle and turn freely upon it; it further includes an eccentric cylindrical extension, which is inserted in the hole in the cam draw-plate. Fence-height adjustment knob 86 is fitted over D-shaped post 83b, seen in FIG. 2.

Referring now to FIG. 2, the underside of cast metal chain-saw carriage-plate 30 includes drive-shaft collar 30a, which encircles motor drive-shaft 39. The chain-saw carriage-plate further includes flat-spring winding-post 30b and flat-spring recess 30c.

Figure 3A:
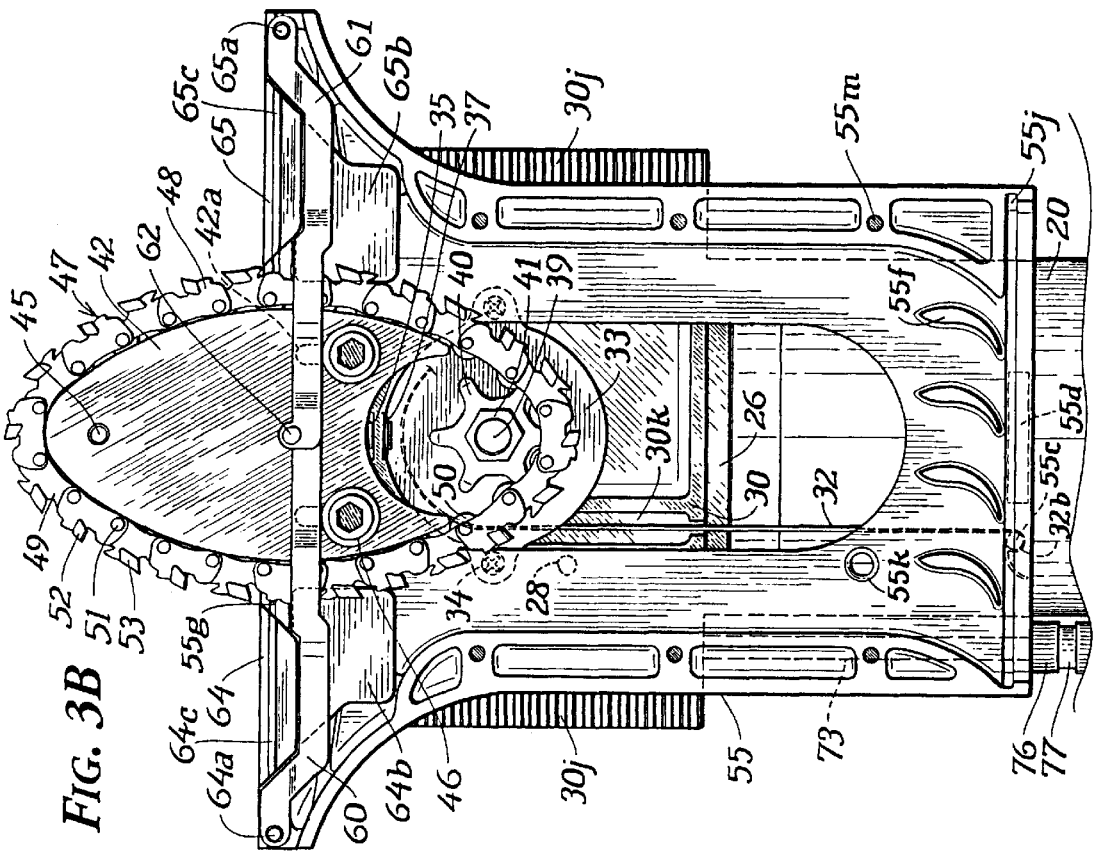
FIG. 3A is a bottom view of the plate-joiner of FIG. 1A with the lower housing removed and the saw-bar partially cut away.

Saw-bar retraction components are best understood by concurrent reference to FIGS. 2 and 3A. Saw-bar mounting platform 30d with a machined flat top surface includes tensioning-spring recesses 30e, tensioning-nut recess 30f, and saw-bar mounting-screw holes 30g. Integral gear-racks 30j are formed in a parallel arrangement along the outer edges of the chain-saw carriage-plate. Nylon spring-liner 31, having a shape like a wide, thin washer, is placed inside the spring-retaining wall, followed by coiled flat-spring 32. The spring's inner winding-hook 32a is engaged with flat-spring winding-post 30b, the spring installed in the recess, and the spring's terminal clip fed through the spring exit-channel 30k. A spring of sufficient length will exert near-constant mechanical resistance over the anticipated travel of the plate-joiner carriage. A second nylon liner is then placed on top of the spring. Spring-cover 33 includes a central hole for the drive-shaft and two mounting-holes, and is fixed in place over the coiled spring with spring-cover flat-head screws 34.

Saw-bar retraction-screw 35 is inserted through the larger of two coaxial unthreaded holes in the raised platform and threaded through saw-bar retraction-nut 36. An unthreaded extension of the retraction-screw, having a reduced diameter, is fed through the smaller unthreaded hole; the retraction-screw is retained in this location by retraction-screw E-ring 37. Rotation of the retraction-screw thus induces linear motion in the retraction-nut. Helical tensioning-springs 38 are located in recesses in the saw-bar mounting platform 30d. Saw-bar 42 may be formed by welding together three metal laminae. The saw-bar includes elongate mounting holes 42a and rectangular tensioning-nut hole 42c, which extend through all three layers. In the top layer, prior to welding, saw-bar spring-compression tabs 42b are cut and bent so as to extend orthogonally from the top side of the saw bar; these tabs are best revealed by the saw-bar modifications illustrated in FIGS. 17A and 18A. When the elongate mounting holes are located over the saw-bar mounting-holes, these tabs engage and partially compress the tensioning-springs in their respective recesses. A portion of the retraction-nut extends above the milled surface of the platform. To mount the saw-bar, the portion of the retraction-nut that stands above the surface of the milled platform is engaged in the rectangular hole in the saw-bar. The saw-bar is then secured to the flat-milled platform by two saw-bar retaining cap-screws 46. Drive-sprocket 40 is installed on the drive-shaft with self-tightening drive-sprocket retention-nut 41.

To join the powered chain-saw subassembly to the base, the carriages' milled L-slots are partially engaged in their complementary rails in the base. Coiled flat-spring 32 is then partly extended and coiled flat-spring terminal clip 32b attached to spring terminal post 55c on the upper saw-housing. Spring tension is thereby introduced between the chain-saw assembly and the upper saw-housing. The chain-saw is retracted until its rearward linear motion is arrested by the contact between the chain-saw carriage-plate and return-stop 55d. The structure and action of the coiled flat spring is best understood by reference to FIGS. 3A and 3B.

As may be seen by concurrent reference to FIG. 2, right and left linkage-arms are joined by linkage-pin 62 and linkage-pin E-ring 63. The extension of the linkage-pin is inserted in saw-bar gate-linkage hole 42d. The left linkage-arm includes a vertical offset, substantially equal to the thickness of the metal, at the hinged end; this offset allows the remainder of the left linkage-arm to be given a structure substantially symmetrical to the right linkage-arm. Each linkage-arm includes a vertically offset region in the vicinity of the cutting-chain path. Another offset allows those sections of the linkage-arms to ride upon and support the guard-plates throughout much of the machine's stroke. The previous offsets are created by transverse bends; a final offset is created by a longitudinal bend near the distal end of the linkage-arms. This last bend elevates the linkage to the same plane as the linkage-posts. The distal ends of the linkage-arms are provided with holes which substantially coincide in diameter to right and left gate linkage-posts 64*a*, 65*a*. The actions of the elements are interconnected by slipping the holes in the distal ends of the arms over the posts on the gates. Right and left gate linkage-posts 64*a*, 65*a* and guard-plates 64*b*, 65*b* are formed integrally in the gates. The right and left gates have raised gate tongues 64*c*, 65*c* which fit in the recessed tracks in the saw-housings. The guard plates travel in a plane just above the chain-saw assembly.

Upper distal linkage guides 55*e* provide support for the linkage and discourage twisting or displacement of the linkage. Upper directional vanes 55*f*, located at the rear of the housing, are airfoil-shaped in transverse section, and are oriented diagonally to direct the ejection of particulate waste from the housing. The vanes serve a secondary utility as a chain trap, and are sized and spaced to permit the passage of waste while prohibiting the escape of a loose or broken chain. The upper housing is formed with upper chute-retaining groove 55*j* inset from its rear edge. This groove, and a similar groove in the lower housing, permit the previously illustrated dust-collection chute to be retained between the joined upper and lower housings.

Figure 3B:
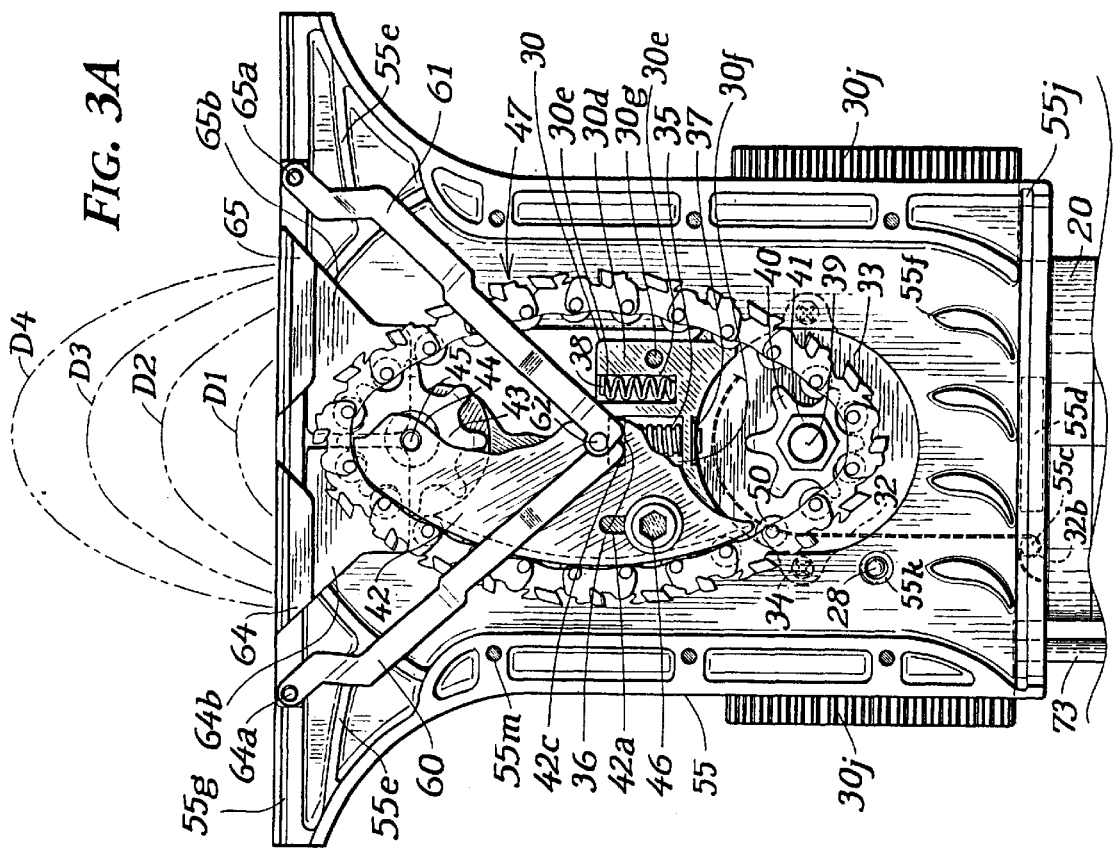
FIG. 3B is a bottom view of the plate-joiner of FIG. 1B with the lower housing removed.
Figure 4:
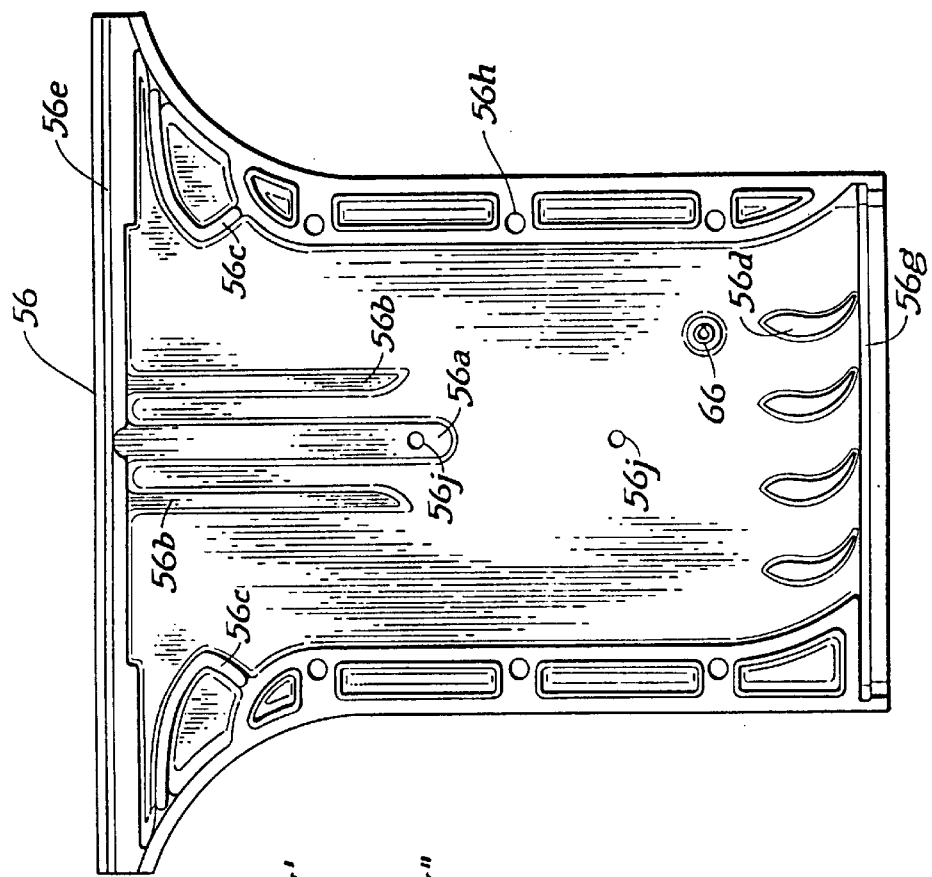
FIG. 4 is a plan view of an interior of the lower housing.

A particular safety feature may be understood in reference to FIGS. 3A, 3B, and 4. Normally-off safety disable switch 28 is mounted in chain-saw carriage-plate 30 and connected to the motor wiring so as to interrupt line voltage. Lower saw-housing 56 is shown in FIG. 4. When the lower housing is removed, and the powered chain-saw assembly is in its fully retracted position, the disable switch is open and prevents the motor from being unintentionally activated. Furthermore, when the lower housing is removed, the button of safety disable switch 28 physically engages in disable hole 55*k* and prevents any forward motion of the sliding components. When the lower housing is reinstalled, enable pin 66 depresses the shaft, closing the switch, which enables trigger-type momentary switch 22. The end of the switch button is then made substantially flush with the top surface of upper saw-housing 55 and thus disengaged from disable hole 55*k*. The sliding components are then free to move, as the domed end of the switch shaft rides in an uninterrupted fashion on the top surface of the chain-saw housing.

The gates, the linkage, and the dust chute are kept in place by the lower chain-saw housing, shown in FIGS. 2 and 4. The lower housing is connected, using saw-housing flat-head assembly screws 67 inserted through unthreaded upper housing-assembly holes 56*h* into corresponding threaded housing-assembly holes 55*m* in the upper housing. Center linkage guide 56*a*, longitudinal linkage guide 56*b*, and lower distal linkage guide 56*c* serve to direct the linkage-arms during their travel. Lower directional vanes 56*d*, lower milled gate track 56*e*, and lower chute-retaining groove 56*g* correspond to equivalent features in the upper housing. The lower housing includes two stationary-mount alignment-holes 56*j* for provisional stationary use.

To replace a cutting-chain, the lower housing and the joined linkage-arms are removed. Saw-bar retaining cap-screws 46 are then loosened. A hex wrench is then inserted through the access hole in the fence armature and into the hexagonal socket of the retraction-screw, and the screw turned. The rotation of the screw induces linear motion in the tensioning-nut and retracts the bar with which it is engaged. The helical tensioning-screws are simultaneously forced into compression by the bent tabs in the top ply of the bar. When the nut encounters the end of its recess, or when the springs are fully compressed, movement is arrested. Cutting-chain 47 may then be disengaged from the saw-bar. A new cutting-chain is then looped around the saw-bar. The direction of rotation of the retraction-screw is then reversed, allowing the helical bar-tensioning springs to extend and draw the cutting-chain tight. An abrupt reduction in resistance will be sensed by the operator as the springs tension the cutting-chain. The saw-bar retaining cap-screws are then tightened until the saw-bar is firmly mounted against the milled surface of the mounting platform. In this manner, the tension exerted on the cutting-chain is predetermined by the selection of the tensioning-springs, and is not dependent upon the instinct of the operator. Over-stressing of the chain links, which might result in accelerated degradation of the cutting-chain, is thereby avoided.

Figure 3C:
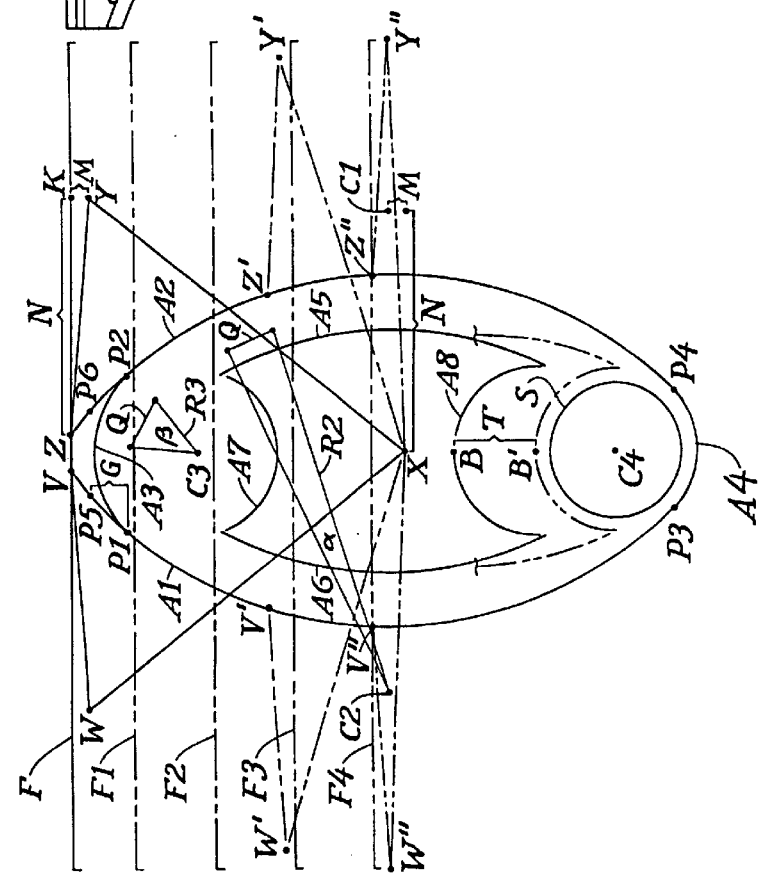
FIG. 3C is a diagrammatic representation of the geometry of the chain-saw plate joiner of FIGS. 1A and 1B.

The underlying geometry of the structures illustrated in FIGS. 3A and 3B may be understood in reference to the schematic diagram of the same view in FIG. 3C. The cutting-chain perimeter is defined by four tangent arcs: side arcs A1 and A2, nose-arc A3, and drive-arc A4. In FIG. 3A, cutting profiles D1, D2, D3, and D4 represent the extended perimeter of the chain-saw at the four predetermined positions previously indicated by the notches in depth-setting sleeve 68. In FIG. 3C, the same relative motion is illustrated; for purposes of illustration, however, the blade is held in a constant location. The front profile of the housing is represented by F. It may accordingly be seen that F, when relocated to positions F1, F2, F3, and F4, intersects the cutting-chain perimeter such that the exposed portion of the cutting-chain corresponds to D1 through D4.

Significant points in the right linkage (on the left in the illustrations) are represented by points V, W, and X. Equivalent points in the left linkage are marked Z, Y, and X; common point X represents the hinge point of the joined linkage-arms. In the device, linkage pin 62 is engaged in saw-bar gate-linkage hole 42*d* at X. Points V and Z indicate the innermost points on the right and left gates, respectively. W and Y represent the hinge points connecting the gates to the linkage-arms. In the plate-joiner, W and Y correspond to the centers of the gate posts. Point Y may be said to have a lateral offset N and longitudinal offset M. Center C1 is constructed by reiterating offsets N and M from point X. If A1 is an arc of radius XY cast from C1, and that arc has been used to determine the sides of the chain-saw profile, point V will follow a path which, from P1 to V", coincides with the perimeter of the chain saw. This property presumes substantial bilateral symmetry in the chain-saw structure.

This property is consistent throughout the useful travel of the chain-saw and the gate-linkage assembly; alternate points V', W', X', and Z', Y', X' indicate the linkages' position at an arbitrary moment in the extension of the cutting-chain. The linkages' position at the full extension of the chain-saw is indicated by points V", W", X", and Z", Y", X". Arcs A5 and A6 are concentric with A1 and A2, respectively, and indicate the profile of the sides of the inner ply of the saw-bar. A5 and A6 therefore represent the surfaces on which cutting-chain bearings 50 ride.

Arc A3 is selected so that it is tangent to A1 and A2 at points P1, P2 which immediately precede the first depth-setting, indicated by F1. This ensures that all cuts will be supported at their outer edges at the completion of the cut. Nose sprocket center C3 is determined retrospectively from A3. The radius of A1 and A2 is approximately four times that of A3. This ratio advantageously permits a housing having a width comparable to that of conventional plate-joiners that is capable of generating a series of joints of varied design. Details of these and other advantages of the geometry of the chain-saw profile are described further below.

Arc A7, which defines the profile of the front of the inner ply of the saw-bar, is cast from A3 at a radius slightly larger than that of the nose-sprocket. A similar situation obtains at the rear of the saw-bar, where S represents the perimeter of the rotating drive-sprocket and C4 its center. At the rear of the saw-bar, however, the retraction of the saw during detensioning of the chain must be accommodated. B represents a typical point on the saw-bar; B' represents the same point when the bar is retracted. Arc A8 is therefore cast from C4 and then offset by the travel, T, of the saw-bar. A8 defines the profile of all three plies of the saw-bar.

P5 represents a point on the extension of arc A1 offset longitudinally from P1 by distance G, where G equals the thickness of the sliding gates. A straight line drawn tangent to P5 defines the minimum bevel angle of the gate. A symmetrical bevel is similarly defined by P2 and P6. Further reference to FIG. 3C will be made in the following discussion of the structure of the cutting-chain.

Figure 5:
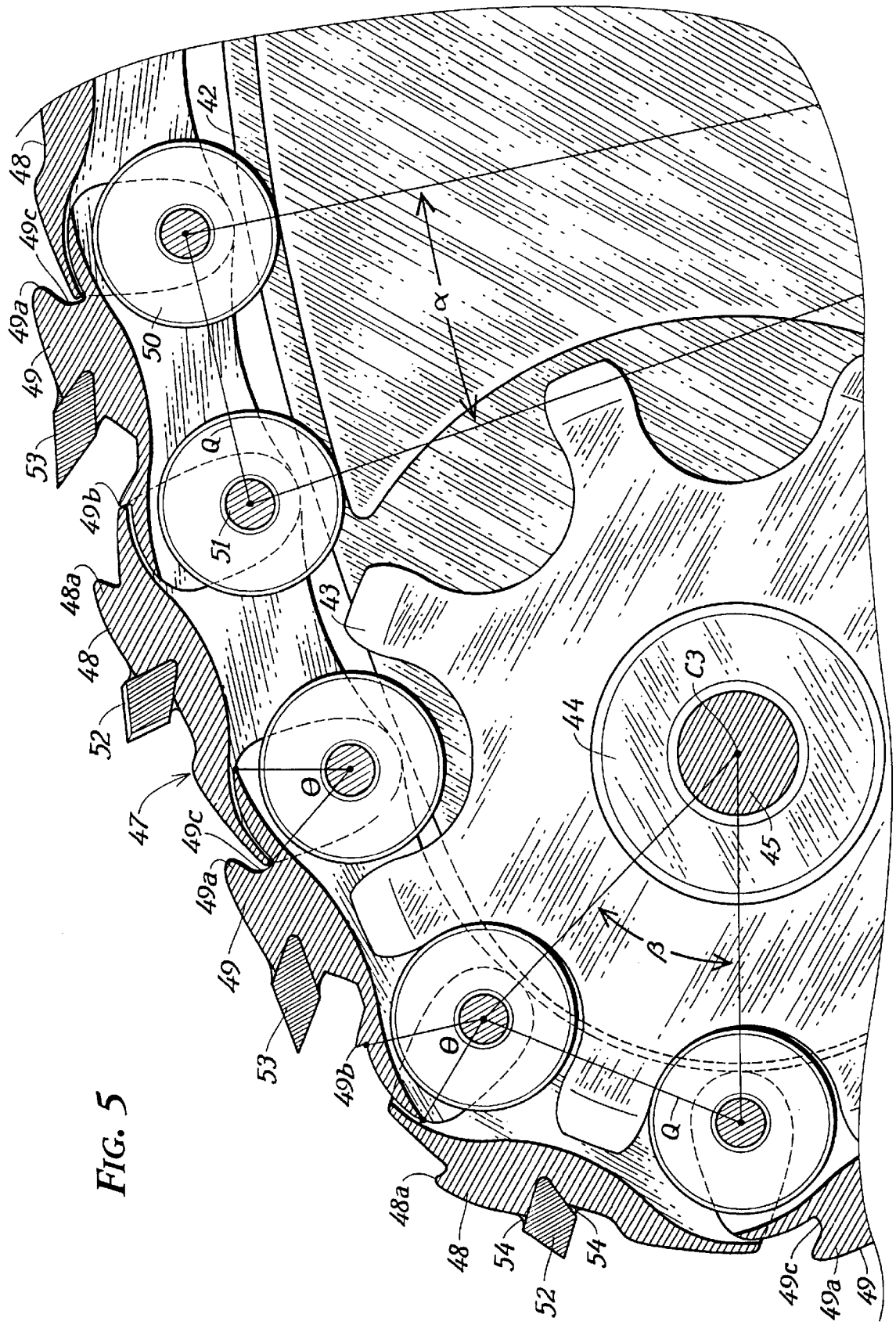
FIG. 5 is a sectional detail of a cutting-chain and bar nose, with the top layer of the bar removed, according to an embodiment of the present invention.

An exemplary embodiment of a cutting-chain is shown in FIG. 5. The top ply of saw-bar 42 is not shown to reveal details of the chain-saw assembly, including nose-sprocket 43, nose-sprocket bearing 44, and sectioned nose-sprocket axle screw 45. It may further be seen that the cutting-chain includes two types of links: external links 48, shown carrying carbide planing-teeth 52 and internal links 49 carrying carbide paring-teeth 53. The structure of the chain may be further understood by concurrent reference to FIG. 8. Teeth are secured by brazing 54. Feed-control spurs 48a, 49a on the external and internal links, respectively, serve to prevent stalling and overheating during operation. Gullets are of sufficient dimension to allow face-grinding of the carbide teeth. Internal links are partially housed within the external links. Cutting-chain bearings 50 are typically composed of monolithic low-friction solid bearing material, such as oil-impregnated sintered bronze, and are carried largely within the internal links. Rivets 51 serve as axles for the freely-rotating rollers. When in contact with the saw-bar, the rollers roll on the inner ply of the saw-bar except where they are carried by one of the sprockets. In the region where the cutting-chain is carried around the saw-bar nose by the nose-sprocket, as may be seen in FIG. 5, a transitional zone exists where the rollers are unsupported. Deflection in this zone is precluded by internal link leading angular stop 49b and internal link trailing angular stop 49c, which cause successive links to bind at a preselected angle. These stops determine the maximum radius of curvature into which the cutting-chain may locally be configured, and therefore the range of profiles it may adopt. Preferably, this curvature is substantially equal to the maximum radius that the chain encounters in its travel, i.e. that of the sides of the chain-saw. That radius is therefore maintained across the unsupported zone, and any further straightening or reflexion averted. The stops are located by reference to the minimum pitch angle $\alpha$. Referring additionally to FIG. 3C, $\alpha$ is the angle between two equal radii, extended from C1 or C2, and separated by chain pitch Q, where Q is measured between two successive rivet centers, and where Q is located at an actual position of the rivet centers at any point where the two associated rollers are in full contact with the sides of the saw-bar.

Similarly, nose pitch angle $\beta$ is defined by center C3 and Q, where Q is located at an actual position of the rivet centers at any point where the two associated rollers are fully engaged in gullets between the sprocket teeth. To avoid the ingress of particulate waste, the links overlap even when conforming to the relatively small radius of the nose-sprocket. The links therefore have a radial coincidence, represented by $\theta$ in FIG. 5, at least equal to the difference between the minimum pitch angle $\alpha$ and the nose pitch angle $\beta$; i.e., $\theta \geq \beta - \alpha$. Links formed in this manner will overlap regardless of their location in the cutting-path.

FIGS. 6A through 8 demonstrate one method of fabrication of the cutting-chain, although it should be understood that other methods of fabrication may also be used. FIG. 6A shows a section of external channel-stock 111. FIG. 6B shows a succession of operations which result in an external link. The channel stock is supported with internal and external convoluted molds, and formed under sufficient pressure to permanently impart that convolution to the stock. The dual molds prevent deformation of the relatively thin sidewalls during this operation. The convolutions typically have a pitch which alternates between chain pitch Q and fabrication pitch Q'. The fabrication pitch is typically smaller than Q, and is selected so as to minimize waste of the channel stock. Convoluted stock 111' permits a cutting-chain design whose cantilever from the saw-bar is significantly reduced. The resulting reduced deflection improves both cutting precision and tracking reliability.

Links may readily be cut from convoluted stock using laser-cutting and wire-EDM, for example. Because the external links carry planing-teeth which are mounted at an oblique angle, an oblique cut is typically made for those teeth in a dedicated operation. External link tooth cut-out 111a is typically removed first, and the remainder of the profile is cut with the cutting-axis oriented orthogonally to the stock, leaving external channel waste 111b. Similar operations are represented in FIGS. 7A and 7B, in which internal channel stock 112 is similarly converted into convoluted stock 112'. The profile of the internal links is cut in a single operation, and internal channel waste 112a removed. The links are then collected for subsequent processes such as hardening, tooth insertion, brazing, cleaning, and assembly. Links of the two types are assembled in an alternating fashion. Rollers are inserted in the channels of the inner links, the parts interconnected with rivets, and the rivets set or spread to produce a permanent assembly. A portion of the completed cutting-chain is shown in FIG. 8.

Figure 9:
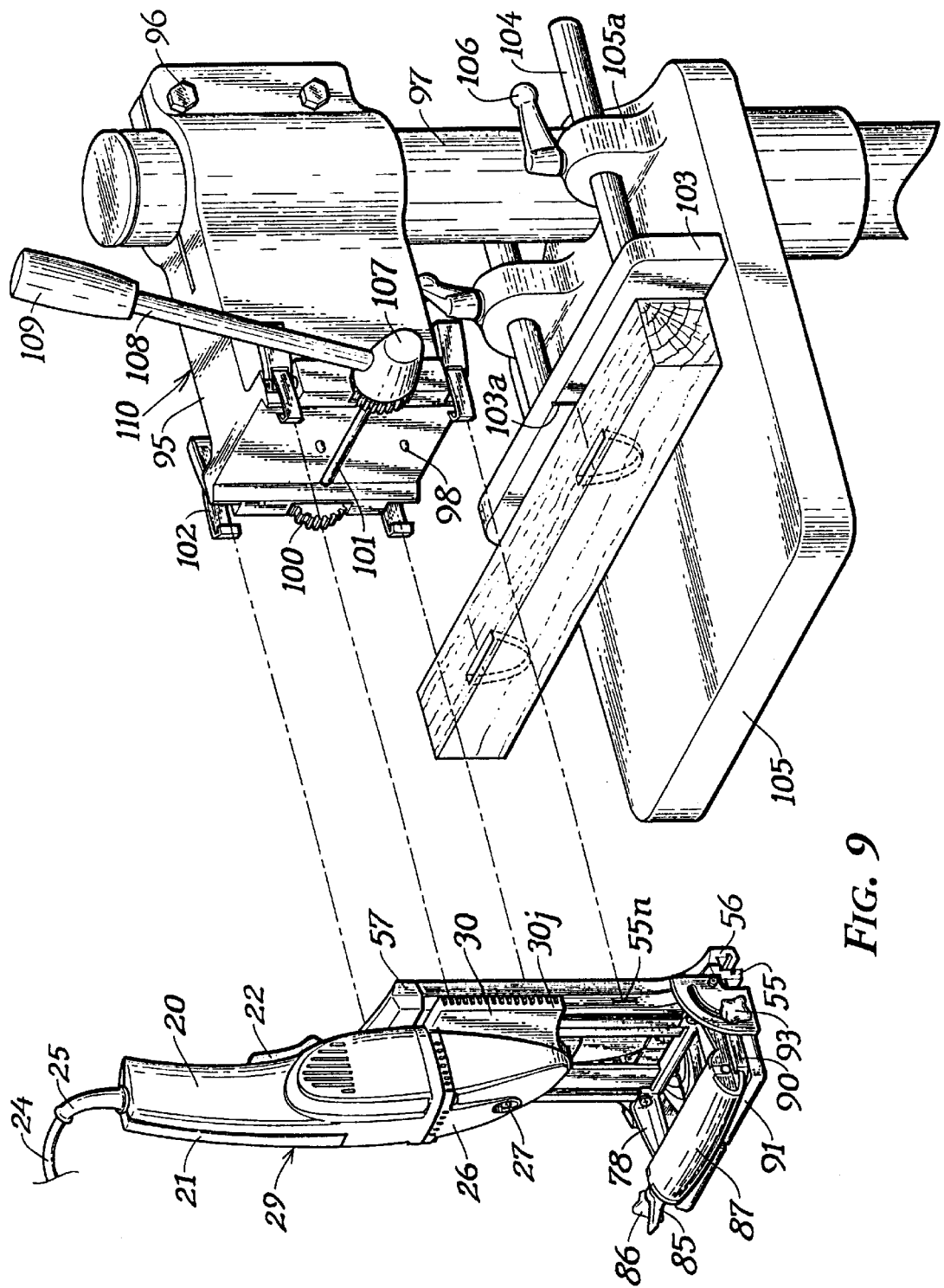
FIG. 9 shows an accessory mounting for stationary use of the chain-saw plate-joiner of FIGS. 1A and 1B.

A plate-joiner stationary mounting 110 is illustrated in FIG. 9. The stationary mounting includes stationary-mount casting 95 which is secured on mounting column 97 with hex-head bolts 96. Stationary work-table 105 may additionally include a means to momentarily elevate the work-table, such as a pedal-operated mechanical or pneumatic lift (not shown). Adjustable work-fence 103 is equipped with work-fence guide-bars 104, which are inserted through holes in raised guide-blocks 105a. Adjustments in the fence position may be made by selectively loosening or tightening work-fence locking-handles 106. Work-fence center-line allows a mark on a work-piece to be aligned. The stationary-mount casting is secured to the mounting column with hex-head bolts. The casting is further outfitted with alignment pins 98 and stationary-mount spur-gears 100. The spur-gears are linked mechanically by stationary-mount axle 101, and may be rotated by advancing the handle assembly rotationally; the handle assembly includes handle mount 107, handle shaft 108, and handle grip 109. The plate-joiner is mounted by engaging the stationary-mount alignment-holes 56j in the bottom of the chain-saw housing with the corresponding pins installed in the casting, while concurrently engaging the plate-joiner's integral gear-racks 30j with the stationary-mount spur-gears 100. Draw-clasps 102 are engaged in the draw-clasp recesses 55n formed in the upper chain-saw housing, and then closed to secure the plate-joiner to the stationary mounting.

The operation of the chain-saw plate-joiner is similar to a conventional biscuit-joiner. Many of the joining components, however, are uniquely adapted to the scale and proportion of the joints made possible by the present invention. Furthermore, there is a correspondence between the geometry of the chain-saw plate-joiner structure previously described and certain structural aspects of a typical right-angle joint; this correspondence allows the fabrication of joints of great strength and reliability.

To appreciate differences between joints made according to the present invention and those made by conventional means, the formation of a typical plate recess is described. First, appropriate settings are selected and secured. A newly-elected cutting-depth is set by disengaging locking-pin 75 from the notch in depth-setting sleeve 68 associated with the current setting, sliding the locking-pin along the longitudinal notch to a new location, and engaging the locking-pin in the notch associated with the newly-elected setting. Because the twist-spring tends to conform to its stable condition, it exerts force both longitudinally and rotationally on the locking-pin; these forces conspire to retain the locking-pin securely in the elected notch during subsequent operation. This sliding-bolt depth-setting system departs from convention and is adapted to the novel extended carriage-travel and resultant depth-of-cut made possible by the present invention. Fine adjustments, typically to compensate for blade-wear or sharpening, are made by repositioning knurled nuts 76 and spacer 77.

The illustrated embodiment includes an adjustable fence that allows the fence angle to be set arbitrarily throughout a given range. The fence angle is adjusted by loosening protractor locking-knob 93, rotating the fence about the lateral axis defined by fence-retaining shoulder-screws 92, and then re-tightening the locking-knob. Fence-height is adjusted by rotating fence-height draw-cam lever 85 so that the flat vertical portion of the fence-height locking-plate is driven into its corresponding recess in the back of fence armature 78. This frees fence carriage 90, and permits the fence height to be adjusted by rotation of fence-height adjustment knob 86 The fence-height adjustment knob rotates the fence-adjusting spur-gears, which in turn induce linear motion in the fence carriage and its related components. Fence-height indicator lines 78a may be viewed through the elongate openings adjacent to the metric and English scales, and an appropriate measured height selected. Fence-height draw-cam lever 85 is then returned to its original locked position, securing the fence carriage at the elected height.

Handles on plate-joiners are often mounted on the transmission housing. Such an arrangement provides legal protection to the manufacturer without providing for safe operation of the device. Safe and accurate operation of a plate-joiner is enhanced when the often subtle relative motion of the sliding components is detectable at all times during operation. This may be achieved in a portable machine when one hand is firmly engaged with the typically stationary fence assembly, and the other engaged with the typically sliding saw assembly. Plate-joiner handles which do not provide such an arrangement are invariably subverted by the operator. Accordingly, the chain-saw plate-joiner is provided with a handle that is integrated into the fence assembly.

In operation, the heel of the left hand is typically placed on molded grip 87. Fence blade-housing 91b encloses the exposed chain-saw during surface-cutting operations, such as hinge-mortising; the degree of extension may be viewed through progress window 91e. The armature should be of sufficient height that fingers of all potential operators are kept at a safe distance from the zone of the cutting-chain. The previously secured fence 91, if extended, is then placed so that its lower surface is substantially coplanar with one face of a work-piece. The substantially planar front face of the joined blade housings is then located so that it is substantially flush with a second abutting face of the work-piece. Work-pieces are commonly marked with a penciled center-line, as with a conventional plate joiner. Fence alignment mark 91h is readily aligned with such marks when provided. Sufficient force is then applied on the grip, in a longitudinal direction, to slightly deform the ribs on the rubber anti-friction-pads in the base of the plate-joiner, and thus preclude any inadvertent lateral displacement during cutting.

Once the position of the machine is secure, the motor is started and the cutting-chain is thereby set in motion about the saw-bar. As the sliding components are advanced, the linkage-arms induce a concurrent lateral motion in the gates. The chain-saw therefore avoids the gates as it emerges from its housing. As material is removed from a wooden work-piece, the paring-teeth encounter end-grain and long-grain, whereas the planing-teeth remove waste largely from the relatively broad side-walls of the cut. Just before the first predetermined depth-setting is attained, the inner edges of the sliding gates will nearly coincide with the path of the outer edges of the moving chain-saw teeth. This situation, as previously described, is consistent throughout the remainder of cut. While the left gate acts mainly as a guard to prevent accidental contact with the cutting-chain, the right gate acts as both a guard and as a chip-breaker. The front face of the right gate is substantially flush with the work-piece and braces the cut on the right-hand side. Tear-out or chipping of the work-piece due to the aggressive action of the exiting teeth is thereby averted. This presents a particular advantage in right-angle joints, where one recess is commonly made in a long-grain face near the cross-cut end of a member. If the work-piece is oriented so that the cutting-chain exits a long-grain face near the cross-cut end, a small piece of material in line with the surface opening is often pried loose and lost. This defect either necessitates a repair or results in a flawed appearance in the assembled joint. The chip-breaking effect of the right gate minimizes such defects by locally bracing the surface of the workpiece where such defects typically occur.

The movement of the chain-saw is arrested at the desired depth, as the foremost knurled nut encounters depth-stop 55b. The sliding components are then allowed to return to their original retracted position, where their reverse-travel is arrested by return-stop 55d. The plate-joiner is then removed from the work-piece. Especially if one of the deeper settings has been elected, a cut of novel depth and accuracy will have been made.

Operation of the plate-joiner as a stationary machine is similar. The plate joiner is fixed to stationary mounting 110 as previously described. Adjustable work-fence 103 is moved to the desired position and locked with work-fence locking-handles 106. A pencil line on a work-piece is aligned with work-fence center-line 103a. Stationary work-table 105 is elevated until it securely contacts the planar face of the joined upper and lower chain-saw housings. The chain-saw assembly is then advanced by grasping handle grip 109 and drawing forward handle shaft 108. As in the previously described operation as a portable machine, movement of the carriage is arrested at a predetermined depth by the depth-stop assembly. As the handle is released, tension in the spirally-wound flat spring returns the chain-saw assembly to its resting position.

Figure 10A:
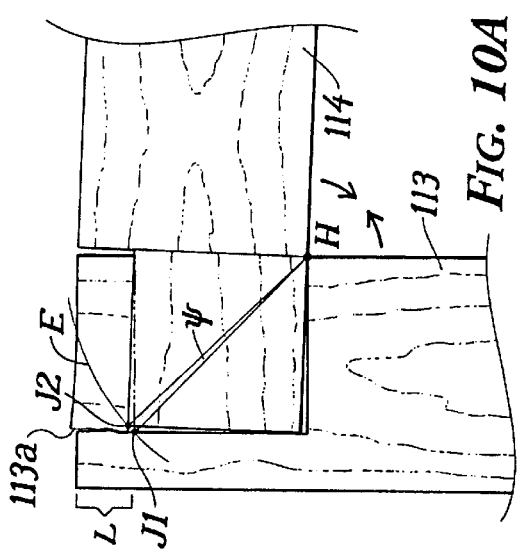
FIG. 10A shows the failure of a square mortise with the vertical member partially cut away.
Figure 10B:
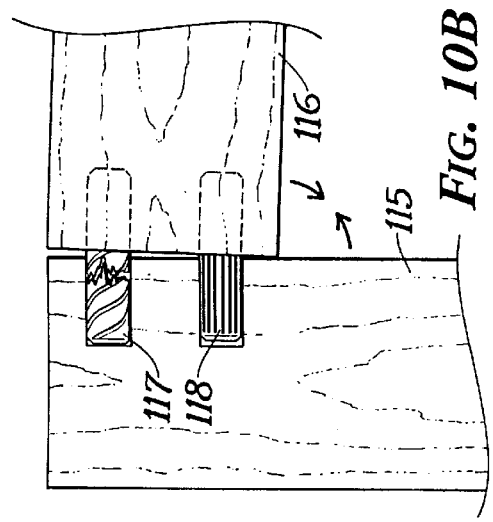
FIG. 10B shows the failure of a doweled joint with the vertical member partially cut away.
Figure 10C:
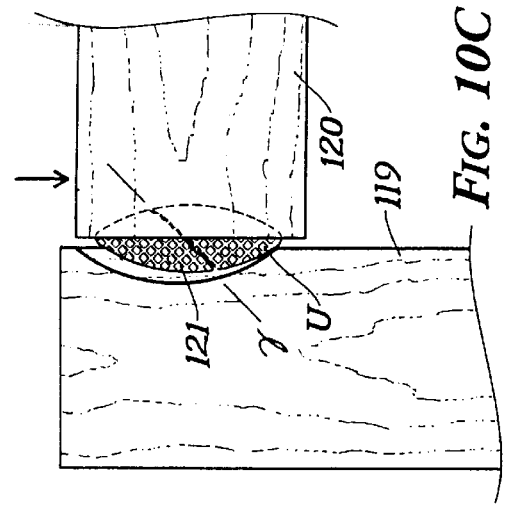
FIG. 10C shows the failure of a conventional plate-joint with the vertical member partially cut away.
Figure 11A:
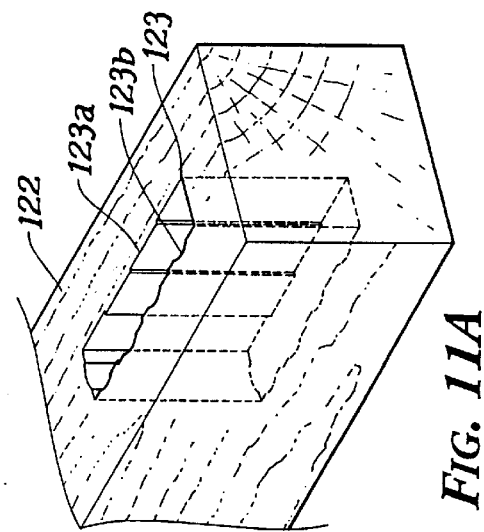
FIG. 11A shows common square-chisel mortiser errors.
Figure 11B:
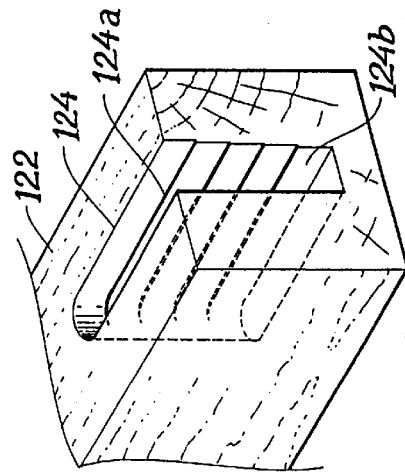
FIG. 11B shows a common spindle-bit error in which side-walls are stepped.
Figure 12:
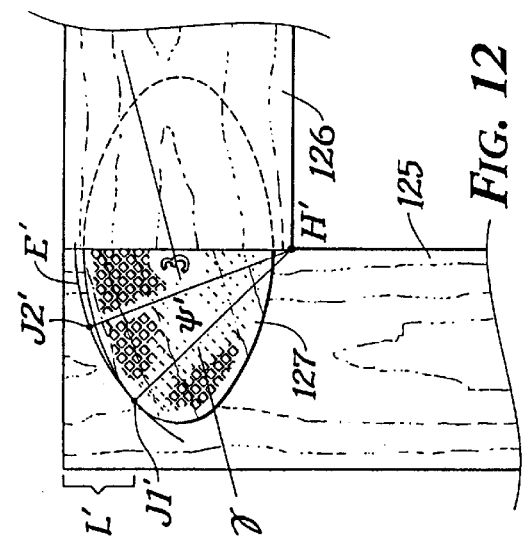
FIG. 12 shows a right-angle joint made according to the present invention with the vertical member partially cut away.

To understand the significant advantages of the profile of the cut provided by the present invention, existing methods of forming and assembling right-angle joints are first described. FIGS. 10A through 10C represent various right-angled joints with their vertical members partially cut away. FIGS. 11A and 11B show common fabrication errors. FIG. 12 shows a joint formed according to the present invention. FIGS. 10A, 10B, 10C, and 12 presume the application of adhesive in a conventional manner; for the sake of clarity, the adhesive is not shown. FIG. 10A illustrates a traditional square mortise-and-tenon, representing a joint comprising square-mortised stile 113 and square-tenoned rail 114. Such joints require considerable labor, and are therefore reserved for the most costly work. While these joints are popularly considered to be the strongest possible, the square mortise-and-tenon joint in many situations suffers from an inherent structural weakness which causes it to fail with regularity. In FIG. 10A, H is the inside corner of the joint, and J1 is the longest diagonal from H to the perimeter of the engaged portion of the horizontal member. L represents the length of the short grain above the mortise. Angular deflection between the members, indicated by the directional arrows, causes H to act as a fulcrum, displacing J1 to J2 through arc E and causing short-grain failure 113a. The deflection angle sufficient to cause the short-grain to fracture is represented as $\psi$. A further disadvantage of the mortise-and-tenon is that its parallel walls produce a piston effect; the combined effects of entrapped air and adhesive are often alone sufficient to fracture the short-grain above the joint. Even when the short-grain does not fail, adhesive is commonly forced through the tyloses to the visible end-grain surface, where it permanently blocks the wood's pores and deters the absorption or adhesion of stains and other finishing materials. Furthermore, internal pressure is often sufficient to prevent the full closure of the joint.

The doweled joint, represented in FIG. 10B by partially cut away drilled stile 115, drilled rail 116, helically grooved hardwood dowel 117, and fluted hardwood dowel 118, suffers from the same piston effect. Helical grooves or flutes are therefore commonly incused in the sides of dowels to ensure closure of the joint. The resultant loss of cross-sectional area however, makes such modified dowels prone to breakage, as shown by helically grooved hardwood dowel 117. Furthermore, the loss of surface area reduces contact between glued surfaces. In the typical doweled joint shown, approximately half the inner surface of the holes drilled in the vertical member will include end-grain, which presents a poor gluing surface. Dowels glued across the grain, especially those whose surface has been reduced by fluting or grooving, are therefore prone to adhesive failure and withdrawal. Such a situation is shown by fluted hardwood dowel 118.

Plate- or biscuit- joints have replaced dowels in some situations, and display remarkable strength despite the shallowness of the cuts into which they are inserted. This strength is due to the increase in the long-grain glue area, the precision of the cuts and the plates, and the compression and texturing of the typically wooden plates. Moisture from water-based glues causes the compressed plates to swell and exert pressure against the sidewalls of the cut. This improves the setting of the adhesive, as well as the mechanical strength of the cured joint. The inappropriateness of a conventional plate-joint for most right-angle joinery is largely due to the shallowness of the cut and the plates inconvenient proportions; as deeper cuts are made, the width of the cut increases dramatically in relation to its depth.

A typical plate-joint failure is illustrated in FIG. 10C. The joint includes a vertical stile 119 and horizontal rail 120 slotted to receive a conventional plate, and conventional wooden plate 121. Shear force, indicated by the directional arrow, induces a mechanical ramping effect at location U. The application of sufficient force causes the joint to gap and fail. Furthermore, unequal internal forces and uneven glue distribution often cause conventional plates to fracture along the axis of the relatively short wood-grain, as shown. The natural axis of the wood fibers in plates, and thus the axis along which breakage is typically most likely, is represented generally in the figures as $\gamma$.

FIG. 11A shows common errors in a hollow-chisel mortise 123 cut in wood stock 122 with a square-bit mortiser. The succession of square holes that collectively form the mortise often fail to align; these staggered square holes 123a cause the mortise to be stepped along its length. The wandering of the internal bit often leaves concave errors 123b in the side-wall of the mortise. FIG. 11B shows a section through spindle-cut mortise 124. Such mortises are cut by routers and stationary spindle-mortisers. Sleeve bearing inaccuracies and bit resonances often result in mortises that show step errors 124a along their depth. Only bottom face 124b then provides useful gluing surface. The errors shown in FIGS. 11A and 11B are exacerbated in joints of small scale, where deflections and resonances in the bit or in the stock are most prevalent.

FIG. 12 shows a right-angle joint formed according to the present invention, in which stile 125 with a chain-cut recess, rail 126 with a chain-cut recess, and a large wood plate 127 collectively form the joint. It may generally be seen that the structure of this joint addresses the shortcomings of previously discussed techniques of right-angle joinery. Comparing FIG. 12 first to the conventional mortise-and-tenon joint of FIG. 10A, it may be seen that the inside corner H' of the joint in FIG. 12 corresponds to H in FIG. 10A. The structure of the joint has, however, been advantageously altered. If stile 125 and rail 126 were deflected as in FIG. 10A, H' would act as a fulcrum. The maximum diagonal, represented as the line from H' to J1', would be displaced along arc E' during deflection. It may be seen by comparison of the figures that the distinctive profile of the wood plate nearly eliminates the prying effect of the engaged member. J1' would need to be displaced through angle $\psi'$ to point J2' in order to induce a displacement of the short-grain equal to that shown in FIG. 10A. Referring additionally to FIG. 3C, it may be seen that the relationship of point H' and arc E' substantially reiterates the relationship of C2 and A2. This correspondence will be substantially in effect for the joints most commonly formed using the large wood plate. A further advantage is shown in that the prying force is broadly distributed about point J1', rather than localized as at J1. Wood fibers will thus tend to compress and recover, rather than be crushed to the irrecoverable point where a progressive degradation of the joint would be initiated. Furthermore, the prying force exerted at or near J1 is resisted by the increased length, L', of the short-grain. At the same time, the width of the engaged member at the joint-line has been increased, providing improved resistance to torsional deflection. The useful surface area has been held substantially constant to that of a conventional mortise-and-tenon joint, while the previously described mechanical advantages of compressed wood have been gained. The curved edge-profile of the wood plate furthermore allows air and liquid to escape during assembly, thereby avoiding the entrapment of adhesive and subsequent problems caused by the inadvertent pressurization of fluids within the joint.

Comparing the plate-joint in FIG. 12 to the doweled joint in FIG. 10B, it may be seen that the large plate is much more deeply engaged in the vertical member than the dowels. The surface area of the large plate is much greater than that of the dowels, and includes relatively little end-grain. Glue distribution is accommodated by the pattern of embossment rather than by the removal of material by grooving or fluting. The shear force shown being exerted on the plate joint illustrated in FIG. 10C would be better withstood by the joint shown in FIG. 12. The entry angle of the large wood plate at the joint line is substantially perpendicular to anticipated shear force, providing optimal mechanical resistance. Fragmentation of the large plate shown in FIG. 12 would be unlikely, as grain axis γ, the depth of the recess, and the high strength of the large glued surface collaborate to resist breakage. Fabrication errors such as those illustrated in FIGS. 11A and 11B are also avoided, since the recess is cut in a single pass using a tool of relatively large cross-sectional area. The width of the saw-bar and various structural asymmetries discourage standing-wave vibration, and therefore allow greater stability and precision than rotary cutting-tools of relatively small cross-section. Such deflections and unwanted resonances increase with the degree of engagement of the cutter in the workpiece, and thus are a special concern when a precise, narrow, deep recess is desired.

Exemplary embodiments of plates that are appropriate for use with the chain-saw plate-joiner are illustrated in FIGS. 13A, 13C, 13D, and 15. A wood plate fabrication layout is shown in FIG. 13B; FIG. 14 is a drill-jig expressly formed for use with specialized perforated plates. A series of four wood plates is shown in FIG. 13A: large wood plate 127, large-intermediate wood plate 128, small-intermediate wood plate 130, and small wood plate 131. These plates show the common characteristics of alphanumeric indicia 127a, 128a, 130a, 131a, center-lines 127b, 128b, 130b, 131b, glue-distribution channels 127c, 128c, 130c, 131c, and relieved edges 127d, 128d, 130d, 131d, respectively. The orientation of the wood-grain is again indicated by γ. It may be seen that the grain axis selected for a plate of a given size would differ, depending upon the size of the plate. Referring from an imaginary axis perpendicular to the plates' embossed center-lines, the grain would be oriented approximately as follows: the large and large-intermediate plates would be at a 15° oblique angle, the small-intermediate plate at a 30° angle, and the small plate at a 45° angle.

While the large plate might be made marginally stronger by aligning the grain with the long axis of the plate, the 15° oblique allows plate blanks 132a to be laid out efficiently on plate stock 132, as in FIG. 13B. Furthermore, the oblique grain orientation is preferred when plates include holes such as those in wood draw-plate 133 shown in FIG. 13C.

The proportions of the larger plates made possible by the chain-saw plate-joiner permit self-closing draw-joints, similar to traditional draw-tenons. This process may be understood in concurrent reference to FIG. 16E. The long-grain of a plate in which the grain was on-axis (0° oblique) would be interrupted by both draw-holes 133a, making the plate weak and prone to splitting; the off-axis grain ensures that only one hole substantially interrupts the long-grain. The draw-plate includes center-line 133b, glue-channels 133c, and relieved edges 133d. Plates are typically die-cut; the draw-holes would typically be formed integrally in this process.

In a wood draw-joint, pins bearing on the side of the holes facing the deepest part of the recess draw the joint closed. In wood draw-plate 133, the holes are aligned on the long axis of the plate; transverse hole centers divide that imaginary long axis approximately in thirds. This hole layout provides sufficient long-grain to deter fracturing of the plate during assembly. The draw-tenon is well known to those familiar with traditional joinery; the draw-plate employs a similar principle. Conventional draw-joint practice requires that the holes in the stock be offset from the holes in the engaged member. Holes in the stock are displaced away from the joint seam, typically by 1 mm (≈0.04") or less. Substantial accuracy is therefore required in the drilling of the stock if the self-closing capability of such an arrangement is to be exploited. Provision is therefore made for a simple but specialized drill-guide 139, shown in FIG. 14. The drill-guide includes face casting 135, recess casting 136, guide-bushing 137 and guide-bushing extension 137'. The bushing and its extension prevent wear and reduce friction. Recess casting elongate hole 136a permits the relative positions of the castings to be adjusted. Drill-guide depth-adjustment knob 138 temporarily secures the relative positions. In operation, the cantilevered tongue of the recess casting is first inserted in the recess. The adjustment knob is then loosened and the bottom surface of the face casting made flush with the face of the work-piece. Drilling to a suitable depth is then performed using a bit equipped with a means to stop the drilling at a given depth (drill bit and stop are not shown). Draw-holes formed in this manner will show minimal error and tear-out.

It will be noted that two hole locations are provided for; FIG. 13D illustrates a plate which would employ the alternate hole nearer the apex of the recess. The plate illustrated in FIG. 13D includes two identical half-plates 134 and 134'. Each half-plate would typically be formed of high-strength homogeneous material, such as metal or fiberglass-reinforced thermoplastic. The apex draw-hole 134a in the half-plate would typically be used to enable rapid assembly in a manner similar to the draw-joint previously described; it might also accept threads for removable installation or cams for repeatably locking the engaged half-plates. Ramped relief elements 134b, resembling scales, help the half-plate resist inadvertent withdrawal. Interlocking hooks 134c allow the halves to be electively engaged. As in other plates, relieved edges 134d ease plate insertion.

Both holes in the drill-guide are used in the installation of heavy-duty repeated-use fastener 140 shown in FIG. 15. The fastener is stamped from heavy-gauge sheet steel, and includes two threaded holes 140a at one end and a fastener hook 140b at the other. In a common repeated-use application, shown in FIG. 15, wooden bed-rail 143 is being equipped to interlock with wooden bed-post 144. Recesses 143a, 144a are made in their corresponding wood members, and may be spaced and repeated as elected. Bolt-holes 143b are made in the wooden bed-rail and countersunk, and catch-pin hole 144b made in the wooden post. Heavy-duty fastener catch-pin 142, comprising elliptical shaft 142a, is threaded into the catch-pin hole. Heavy-duty fastener 140 is inserted in its recess and secured with mounting-bolts 141. The bed-rail and bed-post are then engaged by slipping the fastener hooks over the catch-pins, and drawn tight by rotating the catch-pin through a quarter-turn.

A range of applications of a chain-saw plate joinery system according to the present invention is illustrated in FIGS. 16A to 16E. Adhesive is presumed but not illustrated. In FIG. 16A, recesses have been made in the right and left mitered stock 145, 145', as in a picture frame. Small wood plate 131 has been installed in the left mitered stock. Either the protruding portion of small wood plate 131 or recess 145a is coated with adhesive (not shown), and the joint closed and allowed to cure in a manner consistent with conventional practice. Small-scale mitering tasks such as that illustrated are currently addressed by systems known in the trade as detail plate-joiners, which typically are designed for a 50 mm (nominal 2") diameter cutter, and use plates conventionally marked #1, #2, and #3.

FIG. 16B shows a plywood butt joint, comprising two pieces of plywood stock 146. 146' in which recesses 146a have been made. Small-intermediate plate 130 is dimensioned so as not to protrude through 18 mm (nominal 1.75") plywood sheet, permitting concealed right-angle joints in that material. The small-intermediate plate would also typically be elected for the two pieces of stock which share the same grain-axis, represented in FIG. 16C by long-grain boards 147, 147'. Recess 147a is formed in the left long-grain board in accordance with the present invention. The applications shown in FIGS. 16B and 16C are presently served by the widely used plate-joiners which employ a 100 mm (nominal 4") cutter and plates known as #0, #10, and #20.

Cabinet face-frame joints, such as the one shown in FIG. 16D, include members of relatively narrow cross-section. The traditionally small cross-section of the face-frame members, however, makes this joint a poor candidate for conventional plate-joinery; dowels and pocket-screws being generally preferred. FIG. 16D illustrates that face-frame rail 148 may be reliably joined to face-frame stile 150 using the chain-saw plate-joiner of the present invention. Large-intermediate wood plate 128 is engaged deep in face-frame plate-recess 148a, and therefore allows a joint having strength equal or superior to the best existing methods to be formed with the rapidity and ease-of-use of conventional plate-joinery systems. FIG. 16E shows the final step in the assembly of a three-way joint using wood draw-plates 133 like that shown in FIG. 13C.

A desire to increase the glueable surface of compressed wood plates has resulted in the development of an existing system employing a 140 mm (5.5") cutter and plates known as S4 and S6. Because of the increased size of the opening made by the large cutter, this system is generally limited to large-scale work such as passageway doors. FIG. 16E illustrates how embodiments of the present invention allow the glueable surface of the plate to be increased while extending, rather than limiting, the system's range of applications. The cut made at the setting corresponding to large plate 133 allows plates of much greater glueable area than even the S6 plate, while providing a much smaller surface opening. The plates furthermore are of such proportions that they may be provided with holes and employed as draw-plates. In FIG. 16E, left table-rail 151 has been joined to table-leg 152 using draw-pins 153, and wood draw-plate 133 has been installed in right table-rail 151'. The remainder of the joint is completed by applying adhesive to the joint, inserting wood draw-plate 133 in table-leg recess 152a, and drawing the seam tight by driving draw-pin 153 into table-leg draw-pin hole 152b. If desired, the draw-pin is then made flush with the surface; the draw-pins shown have electively been made flush and left visible because of the traditional association of this detail with fine hand-work. Draw-holes may alternately be made invisibly from the opposite faces of the wood members.

The degree of engagement of a given plate in a workpiece may be indicated by comparison to an arbitrary benchmark. In practice, the structural value of the edge of the plate and the end-wall of the hole are generally negligible. Therefore, if a square recess having a unitary length and a unitary depth, and therefore having a side-wall area of 1, is taken as that benchmark, the approximate relative strengths of various plate-joints may be determined. This numerical index of engagement is mathematically determined by dividing the area of one side-wall of the recess by the square of the length of surface opening of the same recess. This index is particularly useful as it is an indicator of both the glueable surface area of the joint as well as its degree of mechanical engagement. The index of the benchmark is therefore 1, and the index values corresponding to various existing plate-joints are as follows:

| plate size* | system type | index | cutter diameter | side-wall area | recess length | sector angle |
|---|---|---|---|---|---|---|
| 1 | detail | .07 | 50 mm | 30 mm² | 20 mm | 48° |
| 2 | detail | .09 | 50 mm | 57 mm² | 25 mm | 60° |
| 3 | detail | .11 | 50 mm | 103 mm² | 30 mm | 74° |
| 1 | stationary | .12 | 75 mm | 300 mm² | 49 mm | 81° |
| 2 | stationary | .15 | 75 mm | 452 mm² | 55 mm | 94° |
| 3 | stationary | .17 | 75 mm | 625 mm² | 60 mm | 106° |
| H9 | face-frame | .10 | 78 mm | 181 mm² | 42 mm | 66° |
| 0 | standard | .10 | 100 mm | 273 mm² | 53 mm | 64° |
| 10 | standard | .11 | 100 mm | 382 mm² | 59 mm | 72° |
| 20 | standard | .13 | 100 mm | 514 mm² | 64 mm | 80° |
| S4 | oversize | .10 | 140 mm | 535 mm² | 74 mm | 64° |
| S6 | oversize | .12 | 140 mm | 873 mm² | 86 mm | 76° |

*All plate sizes are nominal. Values for joints formed according to the present invention are:

| plate size* | system type | index | nose/side radii | side-wall area | recess length | sector angle |
|---|---|---|---|---|---|---|
| 5 | chain-saw | .17 | 15 mm/60 mm | 95 mm² | 24 mm | — |
| 15 | chain-saw | .27 | 15 mm/60 mm | 477 mm² | 40 mm | — |
| 25 | chain-saw | .44 | 15 mm/60 mm | 1021 mm² | 47 mm | — |
| 35 | chain-saw | .71 | 15 mm/60 mm | 1766 mm² | 50 mm | — |

It may readily be seen by comparison of index values that the present invention provides for joints of greatly increased strength. In fact, the smallest plate in the preferred embodiment has an index equal to the highest index of any existing plate-joinery system. The consistency of index values for existing systems is dictated by geometry of conventional rotary cutters; except for differences in scale, the shape of the plates is fundamentally invariable. By comparing the largest and smallest side-wall areas within a given system, one can also see that the present invention allows for joints of vastly increased range. While this ratio is at best 2:1 in existing systems, in the present invention the ratio is increased to more than 18:1.

FIGS. 17A and 18A show modifications to the profile of the saw-bar according to further embodiments of the present invention. Tapered saw-bar 42' includes two substantially straight sides convergent upon and tangent to a nose-radius; parallel-sided saw-bar 42" includes two substantially straight sides, parallel to one another and tangent to a nose-radius. Features consistent with the saw-bar previously described include elongate mounting holes 42a', 42a", bent tabs 42b', 42b", tensioning-nut holes 42c', 42c", nose-sprockets 43', 43". Wood plates designed for use with the tapered saw-bar shown in FIG. 17A are illustrated in FIG. 17B, where large plate 127', large-intermediate plate 128', small-intermediate plate 130', and small plate 131' are counterparts to plates previously described with respect to FIG. 13. The tapered bar allows an open-ended series of plates; small portable machines for fine work and stationary plate-joiners having longer saw-bars for heavier applications can employ plates drawn from a continuous sequence of typically lozenge-shaped profiles. Spatulate wood plate 127", designed for use with the parallel-sided saw-bar shown in FIG. 18A, is illustrated in FIG. 18B. Spatulate wood plate 127" provides a maximized gluing surface; a series of such plates will present a high degree of consistency in the size of the requisite entry-holes. FIG. 18C shows another advantage of the parallel-sided saw-bar; through-mortise 154a has been formed through wood upright member 154. A joint formed in this manner would be indistinguishable from a joint of the same design formed by time-consuming hand-work.

FIG. 19 shows variously modified saw-bar 42''' and variously modified cutting-chain 47'. Modified external link 48' includes extension 48a' which overhangs the saw-bar; this extension reinforces the links at their connection point, deters the ingress of particulate waste, and improves cutting-chain tracking. Milled roller guide-rail 42a''' in the modified saw-bar engages in synclinally slotted cutting-chain roller 50', further promoting reliable tracking. Such modifications may be implemented as saw-bar length is increased, and the influence of the nose and drive sprockets relatively diminished. Embossed anti-torsion ridges 42b''', formed in the upper and lower plies of the saw-bar, guide the saw-bar and discourage twisting of the chain-saw during cutting. The ridges may be laid out in various corrugations or matrices. Heat dissipation holes 42c''' may be formed through all layers of the bar. Such holes prevent overheating and minimize the associated accretion of wood resins. Saw-bars on some machines may also include round or elongate holes suitable for a drill-bit to pass through, so that recesses and draw-holes may be formed in a concurrent or successive linked operation.

The draw-pins which provided the self-clamping action in previous descriptions may be readily adapted to deliver a measured dose of adhesive to the interior of a plate-joint, and plates may be modified to effectively distribute adhesive over the surface of the plate. Components modified for such use are shown in FIGS. 20 through 25. Furthermore, the physical drawing action is improved by the two-part fastener, in that the draw-pins are installed in the joint in a graduated, two-phased procedure. The design of these draw-pins additionally permits them to be easily collated in a linear or coiled arrays within a suitably formed magazine and installed rapidly by stationary or portable devices. Specialized draw-pin designs are illustrated which provide attachment points for hardware or other devices. Results of these modifications include improvement in the speed with which discrete components may be assembled, elimination of the need for external clamping devices, simplification and regulation of adhesive application, and isolation of workers from direct or airborne contact with noxious or hazardous adhesive materials.

As shown in FIG. 20, modified plate 157 having a radial irrigation pattern is shown in FIG. 20. Draw-holes 157a in the plate provide bearing surface for the draw-pins and ingress for the adhesive. The surface of the plate is indented with a web of overlapping radial channels 157b and annular channels 157c. FIG. 21 shows a cross-section of the modified draw-pin. The illustrated embodiment includes plunger 161, shell 162, and capsule 163 containing adhesive 164. Examples of capsule materials include glass, thermoplastic, foil, and gelatin. Features of the draw-pin plunger include plunger cap 161a, plunger backflow trap 161b, and plunger ribbing 161c. In the illustrated embodiment, the ribbing is in the form of a continuous helical ridge. The draw-pin shell includes collar taper 162a, connector tab 162b, connector tab recess 162c, nose taper 162d, and longitudinal slits 162e, and shell internal ribbing 162f. Ribbing may be readily formed with an automatic unscrewing mold, which provide a continuous surface uninterrupted by seams or flashing.

Capsule 163, having previously been filled with adhesive 164 and sealed, is placed in the hollow core of shell 162. FIG. 22 shows an exploded view of these components. Plunger 161 is then partially engaged in the shell to retain and enclose the encapsulated adhesive, as shown in the cross-sectional view of FIG. 21. The partial sectional views of FIGS. 23A through 23C show an exemplary installation sequence of this embodiment. The sectional views are made along the long axis of a plate. The sequence begins with an intermediate stage of the assembly procedure. Recesses and holes have been made in a manner similar to those previously described. The plate has been previously secured in the end of rail component 166. The rail assembly is loosely installed in stile component 165. Overflow of still-fluid adhesive 164 partially fills the gap between the parts.

In FIG. 23B, the shell has been driven through the draw-hole in the plate, pulling the rail and stile components closer together. In this first phase of installation, any attached connector tabs 162b are folded into their accompanying recesses. Walls of the shell may become slightly distorted or deformed as it encounters the offset draw-hole in the plate. In the second phase of the draw-pin installation, the plunger is driven into the shell. The sides of the capsule bulge from the compressive force, expanding the shell slightly and thereby opening slits 162e. Because the material between the slits is fixed at the top and bottom to relatively uninterrupted volumes of solid material, and because of the shape and location of the capsule, expansion of the shell, and therefore the widening of the slits, will be concentrated near the plane of the intersecting plate. When the capsule bursts, glue is ejected radially in a stellate pattern in the region of that plane. That stellate discharge pattern has a substantial correspondence to the radial channels on the surface of the plate. The annular channels allow for equalization between radial channels and encourage even distribution of adhesive over the surfaces of the plate. The physical advancement of the plunger into the shell draws the joint fully closed. During this advancement, the capsule continues to discharge adhesive until the plunger cap arrests the travel of the plunger. The collapsed, depleted capsule is stored permanently at the bottom of the shell.

The particularly gradual drawing effect of the two-phased pins in this embodiment discourages breakage of the plates; such breakage might otherwise result from impact forces or from tribological resistance commonly encountered with certain adhesives, such as aliphatic resins. In a repetitive industrial application this translates into increased production rates and minimization of defects.

Figures 24A, 24B, 24C:
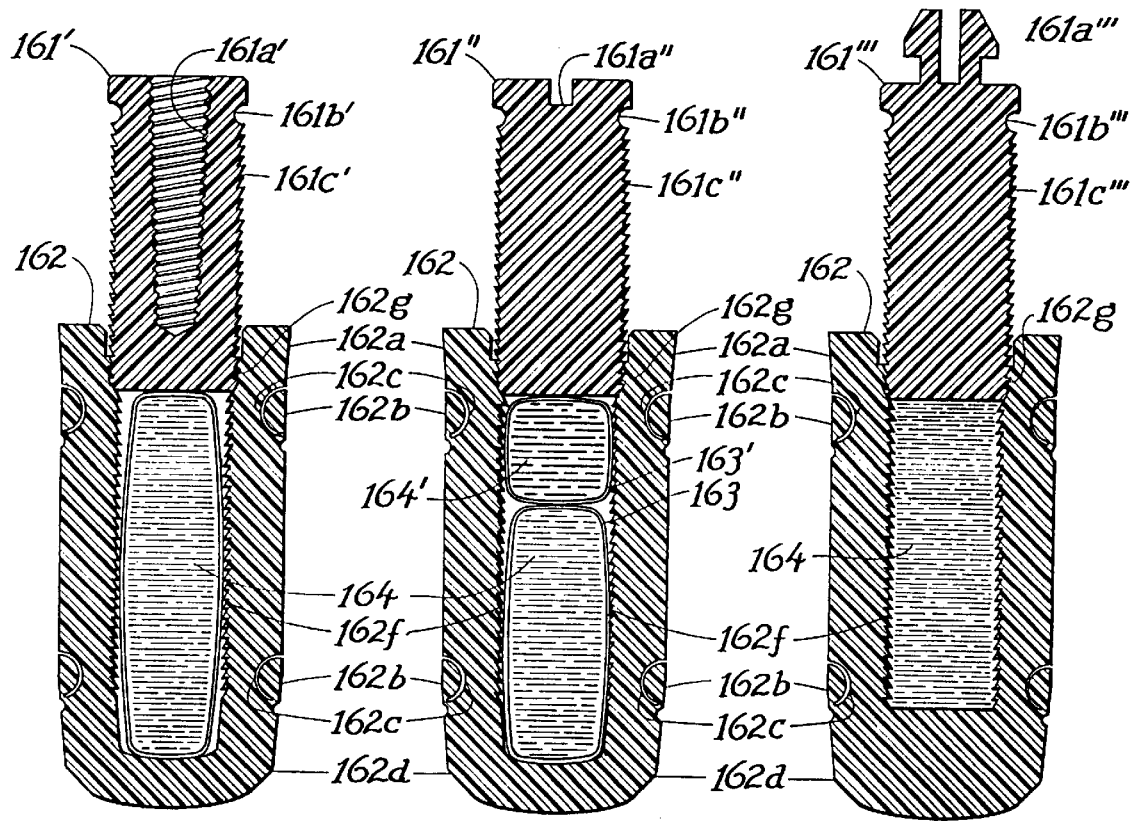
FIG. 24A is a sectional view of a dowel in which the plunger includes a threaded core.
FIG. 24B is a sectional view of a dowel in which the plunger includes a tool recess and the adhesive is provided in two parts.
FIG. 24C is a sectional view of a dowel in which the plunger includes a split-post raised fastener, and in which the fluid is retained directly in the sleeve.

Draw-pins may be modified for various post-installation applications, as indicated by the examples shown in FIGS. 24A through 24C. In these views it may be seen that sleeve internal ribbing 162f includes internal diametrical discontinuity 162g and the ribbing at the entry end has a slightly greater diameter. This allows the plunger to be introduced into this initial depth with relative ease. An increase in the driving force impels the plunger into the region of smaller diameter, causing the shell to expand slightly and bear against the hole side-walls and against the hole in the draw-plate.

FIG. 24A shows a modification in which the plunger includes a substantially hollow, internally threaded core. FIG. 24B shows a plunger 161'' with tool-recess that includes a tool recess 161a'' so that the plunger can be inserted or retracted using a tool of complementary shape. The head of a tool, for example, the head of a screwdriver can be inserted into the tool recess to advance the plunger into the shell. Although a slotted recess is shown in FIG. 24B, the tool recess could alternatively have a shape that is compatible with the head of a phillips head screwdriver, a torx-head screwdriver, a nut driver, etc. The version of the draw-pin depicted in FIG. 24B further includes secondary capsule 163' filled with secondary adhesive component 164'.

This component may be a catalyst, foaming agent, dryer, or other material which by its nature is desirable to keep apart from the primary adhesive component. Both capsules would be burst and their contents mixed during installation.

Figure 25:
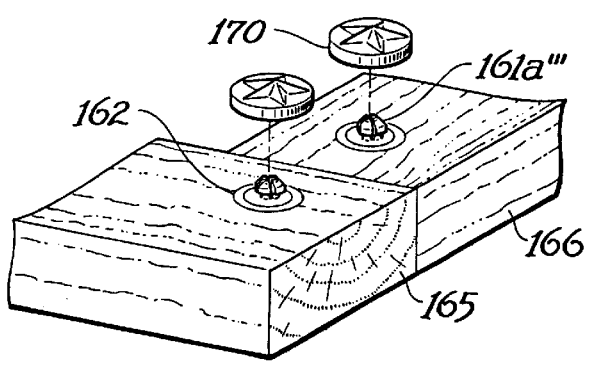
FIG. 25 shows ornamental caps being installed on raised fasteners.
Figure 26A:
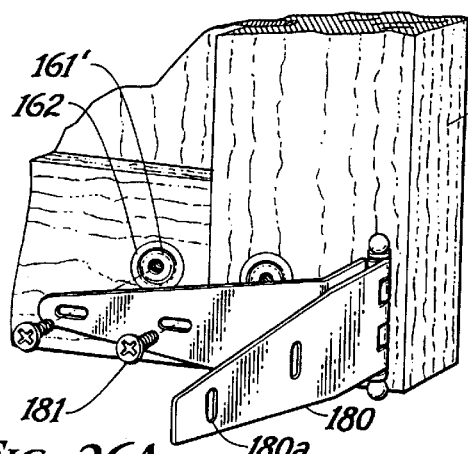
FIG. 26A shows a hinge being installed on the back of a cabinet door.
Figure 26B:
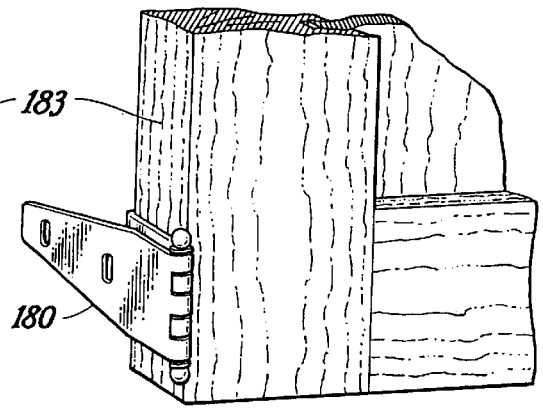
FIG. 26B shows the hinge of FIG. 26A installed and viewed from the front.
Figure 27A:
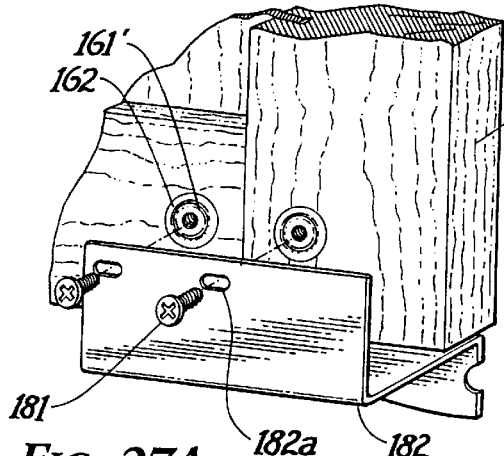
FIG. 27A shows a door pull being installed on the back of a cabinet door.
Figure 27B:
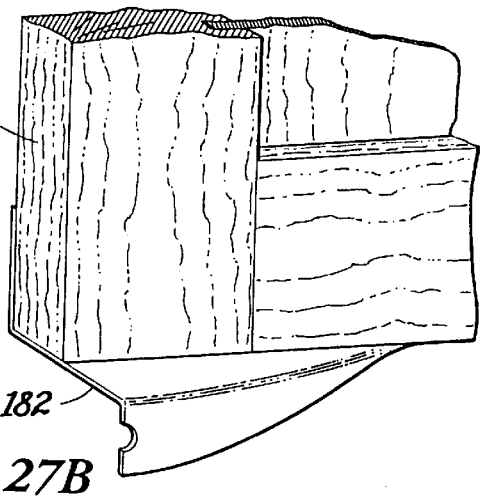
FIG. 27B shows the door pull of FIG. 27A installed and viewed from the front.

FIG. 24C shows another modification of the draw-pin, wherein plunger with raised fastener 161''' includes raised fastener 161a''' on its uppermost surface. Examples of raised fasteners include a raised head, a threaded stud, and the illustrated split-post snap-connector. FIG. 25 shows how ornamental caps 170, for example, may be installed on such fasteners. FIG. 24C illustrates a further modification where the adhesive is not encapsulated, but is instead enclosed in the draw-pin itself. Channels in the surface of said draw-pins may be formed so as to retain a membrane-thickness covering, or, alternately, may be provided with a membrane-thickness coating in a discrete operation. Alternatively, the draw-pins may be left empty, and the two-part draw-pin employed exclusively for its mechanical advantages. The sleeves may also be filled with fluid other than adhesive; such an occasion might arise, for example, if the plates were coated with dry adhesive which was to be subsequently activated when solvent was discharged into the joint. Plunger elements in common with other illustrated embodiments of the two-phased draw-pin include backflow traps 161b', 161b'', 161b''', and external ribbing 161c', 161c'', 161c'''.

Figure 28:
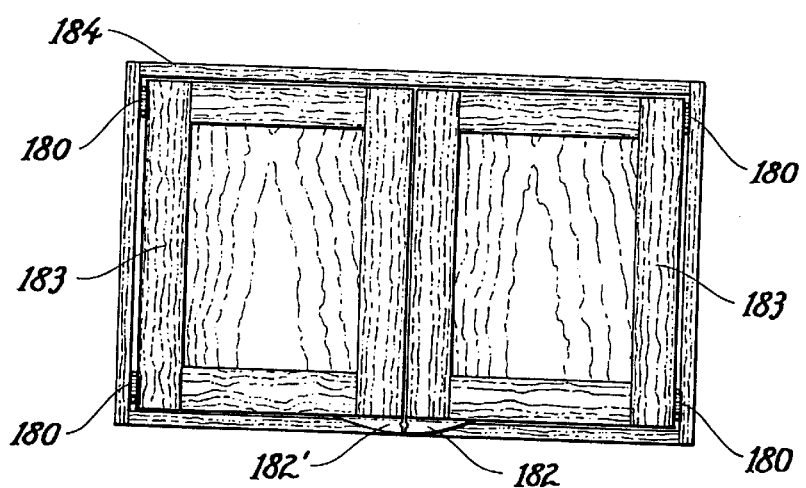
FIG. 28 is an assembled cabinet using hinges and pulls according to FIGS. 26–27.

Draw-pins may be modified for various post-installation applications. FIGS. 26A through 28 show applications for the draw-pin shown in FIG. 24A, that permit the attachment of hardware without additional drilling. In the illustrations, frame-and panel door 183 has been assembled using the draw-pins which include a preformed internally threaded hole. This permits hardware such as hinge 180, shown in FIGS. 26A and 26B, and finger grip 182, shown in FIGS. 27A and 26B, to be installed using hardware fasteners 181. Elongate holes 180a and 182a permit adjustment of such hardware components subsequent to their initial installation. The front shown in FIGS. 26B, 27B, and 28 demonstrate that both the means of assembly of the door and the means of attachment of the hardware are invisible on the exterior of the assembled cabinet. The finished cabinet in FIG. 28 shows a typical symmetrical pair of doors installed in cabinet carcase 184, and includes symmetrical right and left pulls 182 and 182', respectively.

Other applications for the draw-pins described above may be readily envisioned by one skilled in the art. For example, the draw-pin shell 162 can be used with a conventional dowel or any other compatible fastening member that is dimensioned to fit within the shell. Draw-pin shells can be inserted into aligned recesses in different members with a conventional dowel used to join the two members. As the adhesive distribution pattern provided by the shell distributes the adhesive uniformly about the dowel and without backflow of the adhesive, such a joint is both faster to assemble and more durable than a conventional doweled joint.

FIGS. 29 through 38 illustrate further embodiments of the cutting-chain. Market expectations commonly require that cutting-tools performing a given task be offered both in relatively inexpensive high-speed steel as well as longer-wearing silicon carbide versions. Thus, some embodiments of cutting-chains employ relatively inexpensive sheet-metal links. Although structurally varied, these different embodiments of cutting-chains share many functional characteristics with the previously described embodiment; first, friction due to the tension of the chain is substantially borne by rollers rather than directly transmitted to the saw-bar; second, the range of angular motion of the links is actively restricted; and third, voids between the links are enclosed or shielded to discourage contamination with waste material removed from the workpiece.

In the embodiment of FIGS. 29 to 33, the chain is assembled using an arrangement of tubular elements which serve a dual function as hollow rivets and as bushings for rolling components. This configuration allows a middle layer of links that includes a spur to engage with a slot in the edge of a saw-bar. This embodiment thus allows for many designs combining production economies with a low degree of friction and a high degree of tracking reliability. In the alternate embodiment shown in these figures, modified rivets act as the rolling components. This embodiment also induces an equalized angular action between successive links. This action improves fluidity of motion in the constantly flexing chain and prevents local rocking or kinking of the links. Such local deviations from the desired path may contribute to tearout, burning, glazing, and premature tooth wear, and may furthermore introduce high momentary stresses which can result in kickback or chain-breakage. The structures which prevent such dislocations are integrated with features which define the two limiting chain radii. As in the previously described embodiment, these radii correspond to the extremes of curvature the chain may obtain and may independently be positive, negative or null.

Figure 29:
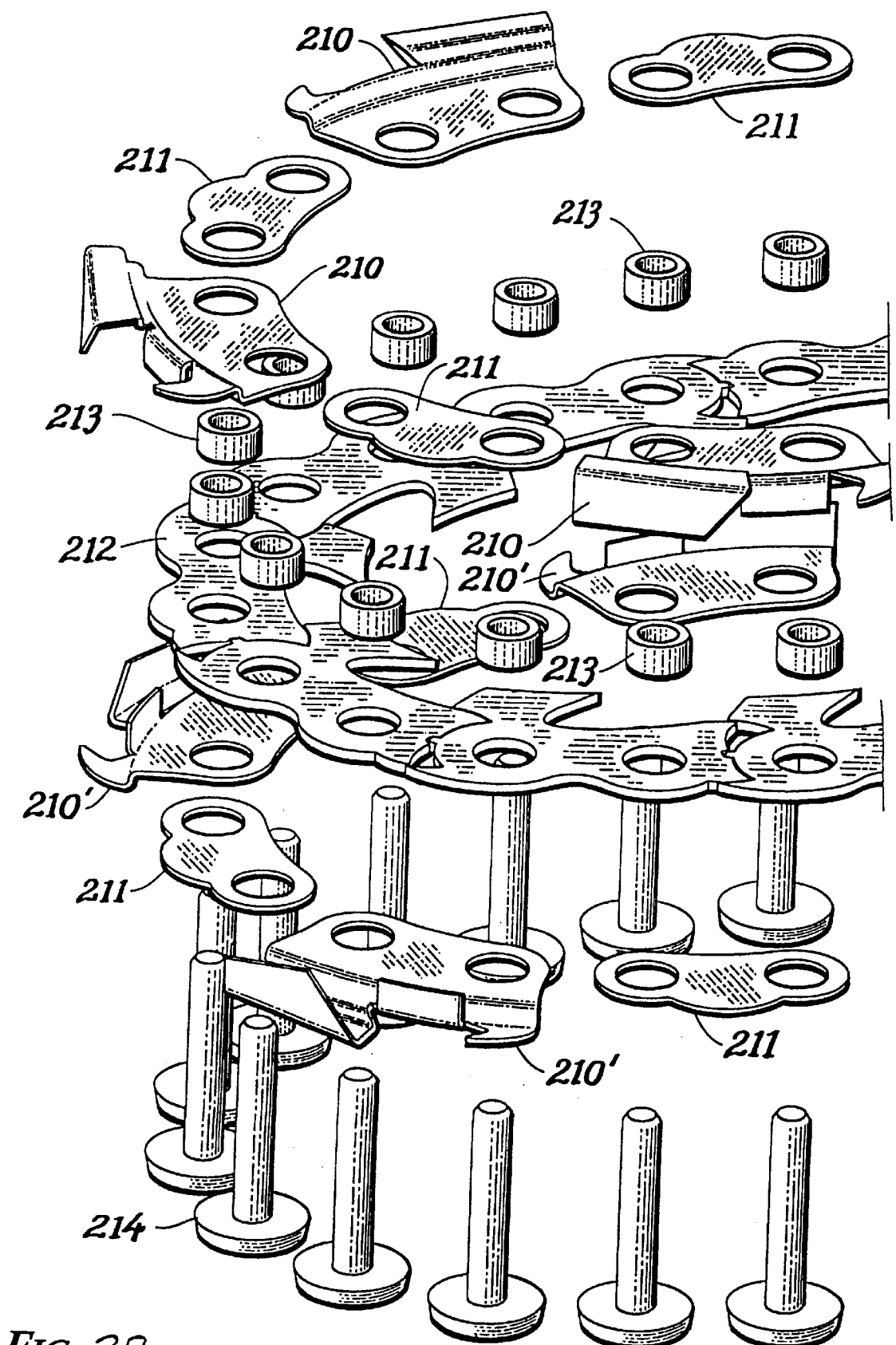
FIG. 29 shows an exploded view of a modified cutting-chain using stamped links and external rolling rivets.

As shown in exploded form in FIG. 29, the cutting-chain includes three distinct layers of links. The uppermost layer in FIG. 29 includes stamped tooth links 210. Tooth links in this layer alternate with external connector links 211. A similar lower layer includes opposite stamped tooth links 210' and connector links 211. Alternating links in these outer layers are spanned by internal links 212. Each link has two holes formed therein, and holes in all links are typically of similar diameter. The middle layer is offset from the outer layers by the half-length of a link, so that when the links are connected, a continuous chain is formed.

The connection of the layers may be attained by the following exemplary procedure, although other methods of assembly may alternatively be used. The three layers of links are stacked so that their flat faces are substantially in contact, and their holes coaxially aligned. Roller rivet bushings 213, having an outside diameter substantially equal to the diameter of the holes, are then inserted so as to traverse all three layers and protrude slightly above the surface of the external layers. The bushings would then be fixed to the outer links, whereas the inner links would be allowed to turn freely about the bushings' outer diametrical surfaces. The fixing of the bushings may be effected by entering tapered forming dies into the cores of the bushings, flaring the ends slightly and binding the bushings against the links in the two outer layers. This assembly step may alternately be attained by providing the outer links with holes of slightly smaller diameter than those in the middle layer, and then forcing the bushings into place. The bushings may also be held in place by staking the surrounding metal or the rim of the bushing itself. A thin bushing may be rolled over to bear against the external faces of the outer links, in a manner similar to hollow-riveting. Other assembly methods may be adapted to the type of materials employed. Nonmetallic bushings, for example, might be crimped or cemented in place; thermoplastics such as polyamide-imide might be installed by momentary elastic deformation or molded in situ. In general, clearances, coatings, composite materials, and lubricants would typically be employed as appropriate, and in a manner consistent with known practices.

Rolling rivets 214 are inserted through the hollow core of the bushings and a head formed on the opposite end. The head-forming die would typically be complementary in shape to the original rivet head, so that similar heads would be formed on both sides of the chain. Various means can be used to ensure that the shaft of the rivets turn freely within the bushings. Hot-worked parts may be freed by cooling and subsequent shrinkage. Rivet shafts may be variously reduced in diameter, tapered, indented and bellied to anticipate forming stresses and produce a consistent and effective result. Alternately, parts between which clearance was desired may be coated to a thickness substantially equal to the desired clearance between the parts. The rivet shaft may be allowed to expand to the diameter of the hole during forming, but would be freed when the coating was removed, dispersed or altered by subsequent exposure to treatments such as those using heat, solvent, or vibration. Deformations of the shaft due to mechanical forming would be substantially eliminated if secondary rivet heads were produced independently and attached using processes such as spot-welding, brazing, threading, cementing, force-fitting. The rollers may additionally be formed from tubular hollow rivets; the ends can be flared into a bell at either end so that the rims of the flared bells ride on the saw-bar.

Figure 30A:
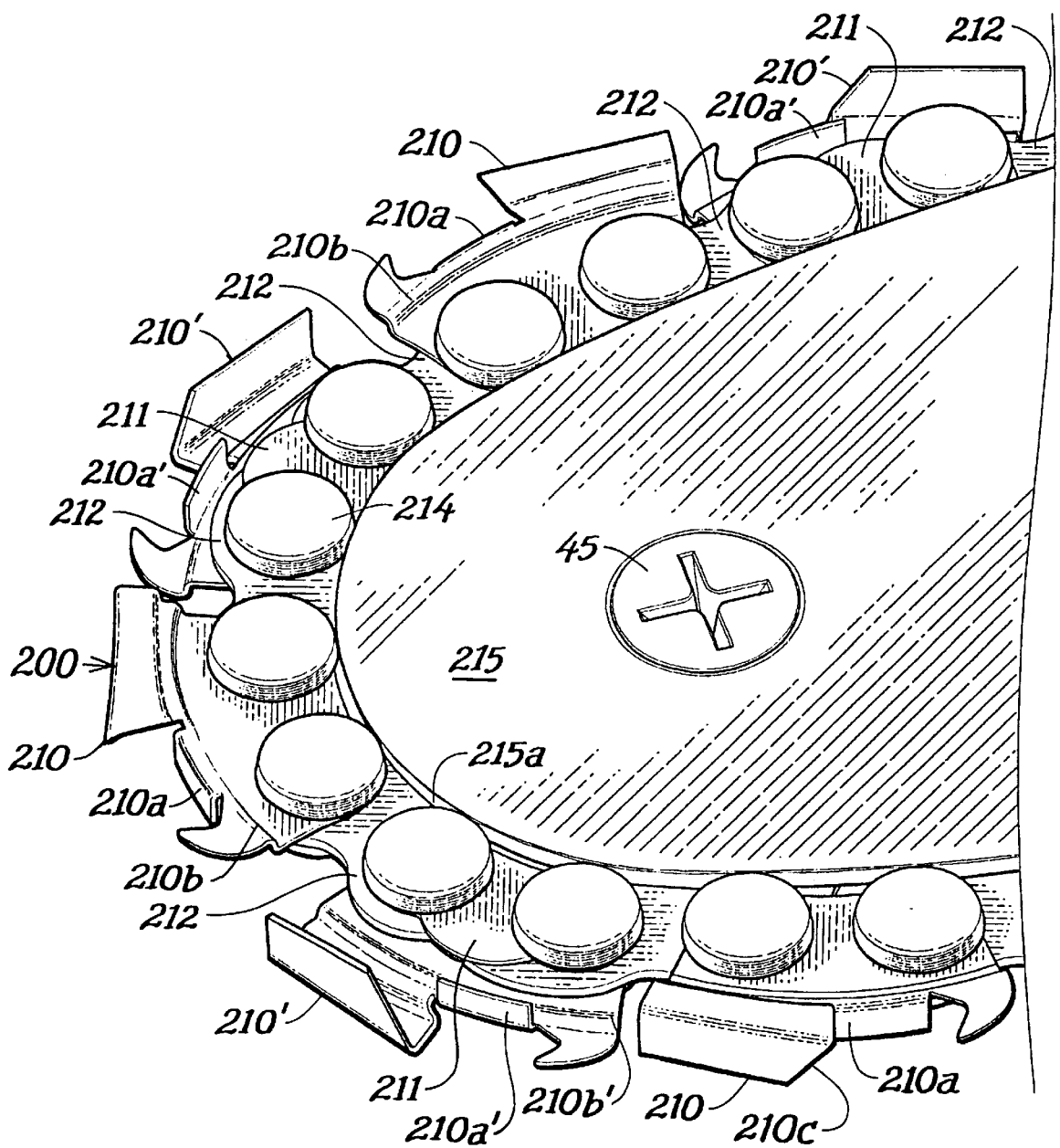
FIG. 30A is a view of the assembled chain of FIG. 29 mounted on a saw-bar.
Figure 30B:
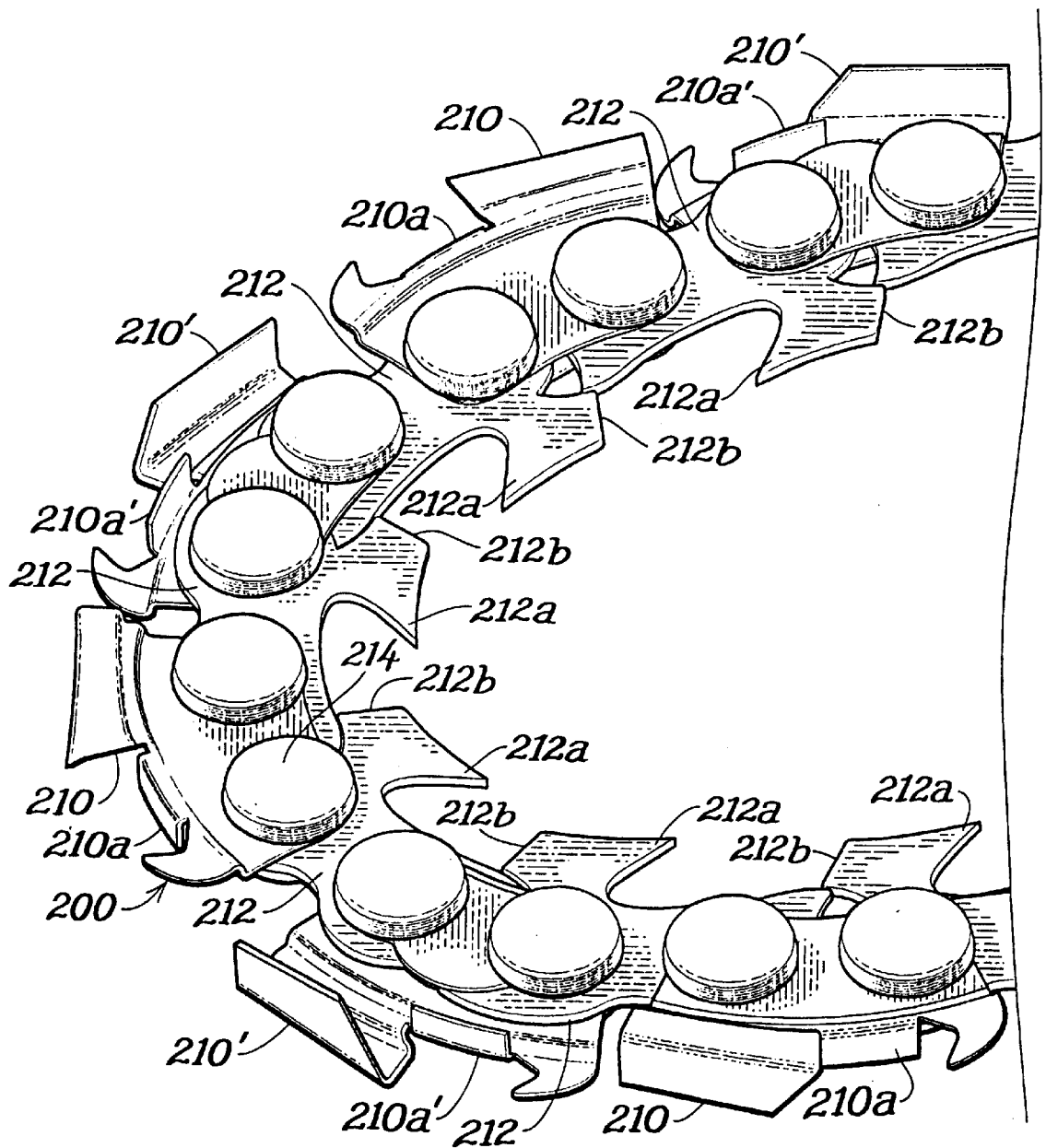
FIG. 30B is a view of the assembled chain of FIG. 29 without the saw-bar.

The embodiment described immediately above includes features to discourage the incursion of waste into chain and bar interstices. Referring now to FIGS. 30A through 30C, and FIG. 33, these features are represented by chip deflectors 210*a*, 210*a'* and fenders 210*b*, 210*b'*. These features may alternately or additionally be formed on links other than those carrying teeth. FIG. 30A shows an assembled cutting-chain being installed on a specialized saw-bar 215 which is formed with beveled edges 215*a*. FIG. 30B shows the chain alone; it may be seen that center links 212 extend into a guide-slot in the edge of the laminated saw-bar. The chain may used with or without a nose-sprocket; a nose-sprocket may be used to extend the life of a chain by transferring stresses from the rolling rivets to the nose-sprocket. Cleanout spurs 212*a* remove waste accumulated in the guide-slot.

Figure 31:
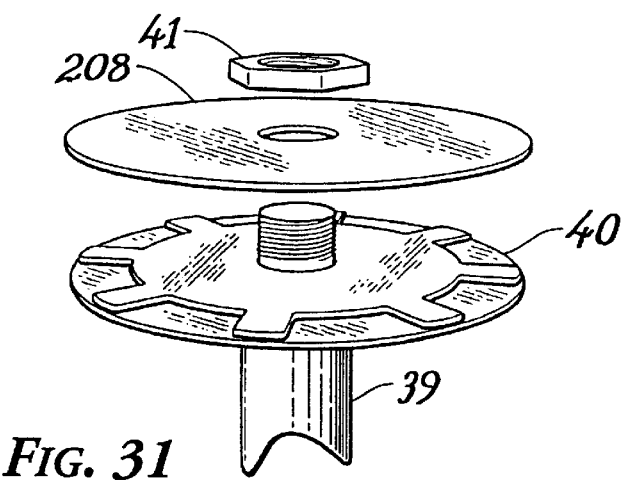
FIG. 31 shows a sprocket and guide plates for use with the chain shown in FIGS. 29–30.

As shown in FIG. 31, a drive sprocket suited to this second embodiment is mounted on a drive shaft sandwiched between two circular plates 205 similar in diameter to the large diameter of the drive sprocket. These plates provide support for the chain and retain the chain and encourage it to remain on a strictly planar traverse.

Figure 30C:
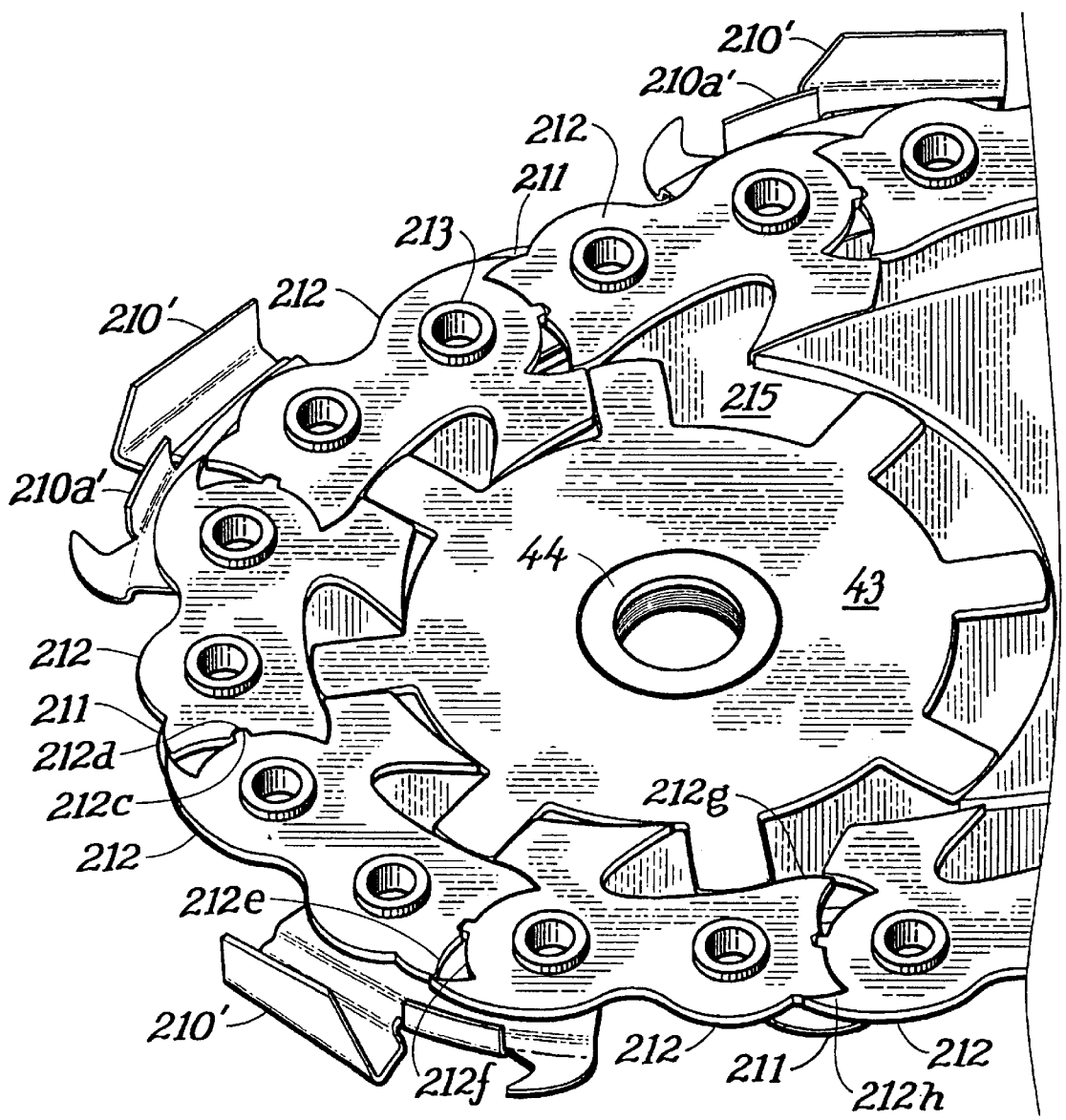
FIG. 30C is a view of the assembled chain of FIG. 29 with the rolling rivets and the top layer of links removed.
Figure 32:
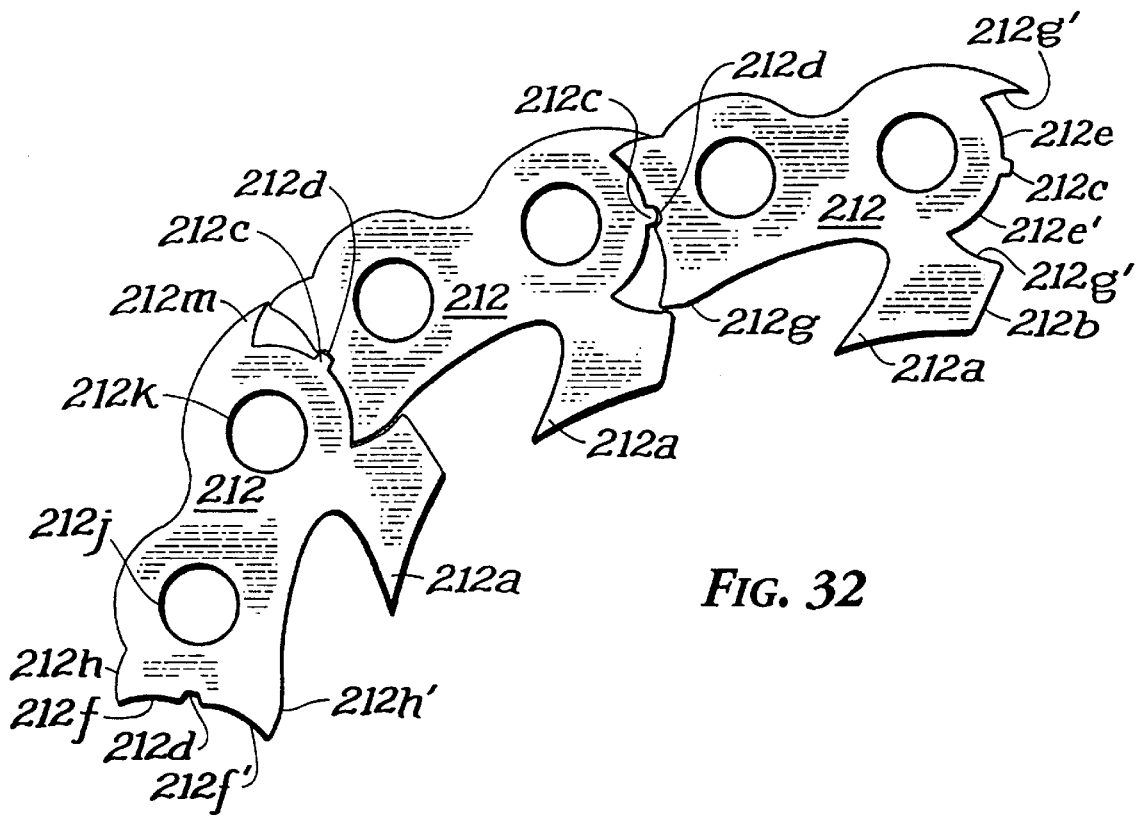
FIG. 32 is a detail of a chain showing the action of three consecutive internal links.

The equalized action of the middle layer of links may be understood in reference to FIGS. 30C and 32. FIG. 30C shows a perspective view of the chain-saw with the top layer of links, the rivets, and the top ply of the saw-bar removed. FIG. 32 is a plan view of three isolated links showing the range of motion permitted by the design of this embodiment. Integral stops limit the set of curves into which the chain may be arranged. The set of curves is delimited by two differing radii of curvature, both possessing, in the instance shown, positive curvature. As in the prior embodiment, chain pitch is constant. The internal link's profile is defined by a set of curves. Outer and inner trailing edge curves 212*e*, 212*e'*, in the case illustrated, are arcs cast from the center of trailing bushing hole 212*k*. This allows the hole to be surrounded with an equal amount of material and avoids local points of weakness. Outer leading edge curve 212*f* corresponds to trailing edge curve 212*e*; these two curves are chosen to abut when the chain attains one of the extreme radii of curvature, typically the larger. Inner leading edge curve 212*f'* corresponds to trailing edge curve 212*e'* in a similar manner; these two curves are chosen to abut when the other extreme radius of curvature is attained, typically the smaller.

The equalizing action is mutually induced by pivot tooth 212*c* and pivot notch 212*d*. While the exact location of the tooth and notch is not critical, the tooth and notch are typically located in the vicinity of the imaginary arc cast through the centers of leading and trailing bushing holes 212*j*, 212*k* when tentative link profiles are arranged in an arc intermediate between the extreme chain curvatures. The pressure angle of the notch will usually be slightly greater than the pressure angle of the gear-tooth, typically differing by the anticipated degree of angular motion between the links as they move between the extreme radii of curvature. A single-tooth design is shown in this embodiment; however, a given link in an alternate design may include a series of gear-teeth as well.

Outer and inner trailing pivot arcs 212*g*, 212*g'*, and corresponding outer and inner leading pivot arcs 212*h*, 212*h'* are substantially concentric upon a point defined by the apex of the pivot tooth. Spur heel 212*b* and internal link tail 212*m* are of sufficient dimension that there is a degree of overlap of adjacent pivot arcs 212*g* and 212*h*, and a similar overlap of adjacent pivot arcs 212*g'* and 212*h'* at all locations within its permitted range of motion. Ingress of debris into the open interstices is thereby avoided. It may be seen by reference to the preceding figures that these interstices are substantially enclosed on the remaining sides by the outer layers of links and by outer plies of the saw-bar. While circular arcs would suffice for the illustrated embodiment, it is understood that involute, cycloidal or other noncircular geometry may be elected where appropriate.

Figure 33:
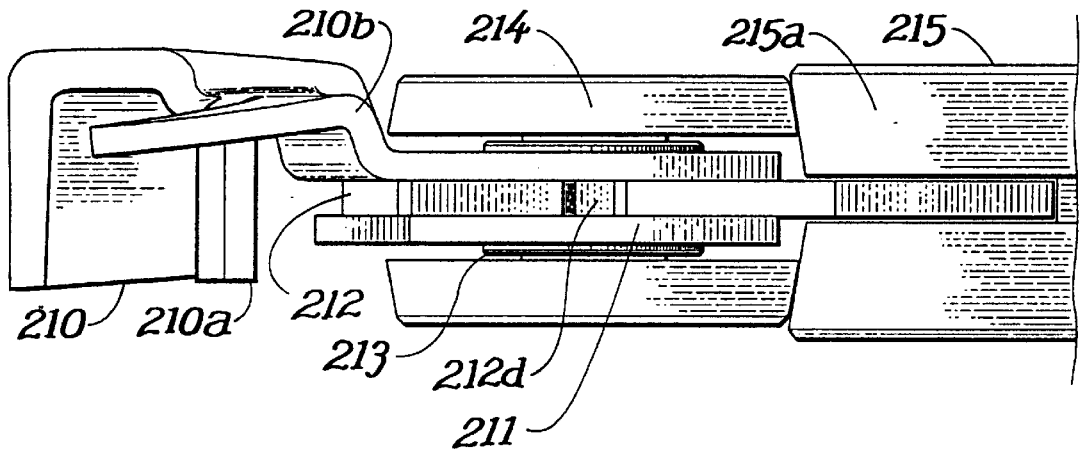
FIG. 33 is an elevation of a chain including a single set of chain components.

FIG. 33 is an elevational view showing elements of the chain-saw arranged on saw-bar 215. For purposes of clarity, only one example of each type of cutting-chain component is shown. In particular, it may be seen how the beveled edges of rolling rivet 214 meet beveled edges 215*a* of the saw-bar. The pitch of the bevels induces the chain to be self-centering. Under a load such as that encountered when cutting, internal link 212 bears against the internal faces of the outer saw-bar plies and to deter any gross displacement of the cutting-chain.

Another embodiment of the cutting-chain is illustrated in FIGS. 34 through 38. Features differentiating this embodiment from the previous two embodiments include: first, equalizing angular stops are carried on the external links as well as the internal layer, increasing strength distributing wear; second, tooth links include an additional bend so that the tooth is disposed on the opposite side of the link and so that the interstices of the links in the center layer are covered; third, links are provided with bent feet so that they may be carried by rollers within the saw-bar and so that they may be driven by a sprocket; fourth, the chain incorporates planing teeth as well as paring teeth, in order to produce an improved surface quality on the side-walls of the recesses; and fifth, the chain includes bent-over depth-control spurs, which reduce spur wear and improve performance in relatively soft materials. Other distinctive features will become apparent in the following description.

Figure 36:
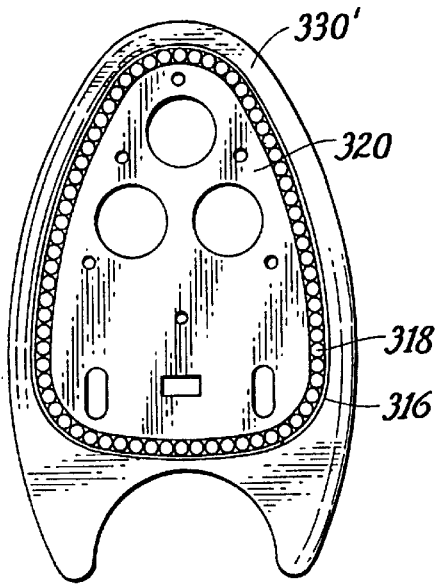
FIG. 36 shows roller bearings and a retaining band mounted about the center ply of a modified saw-bar.
Figure 38:
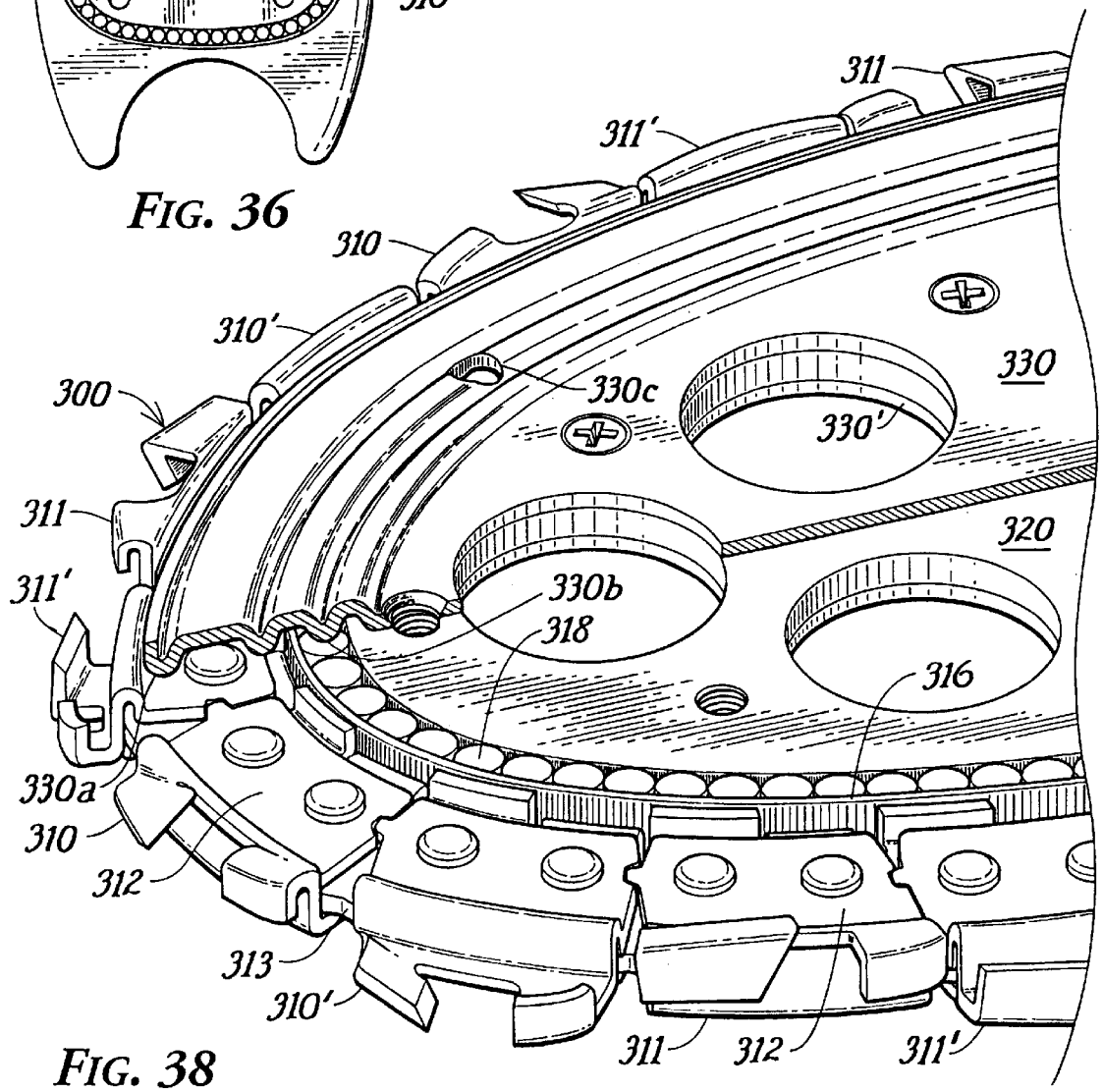
FIG. 38 shows a footed cutting-chain in place on the saw-bar.

It may be seen in reference to FIGS. 34, 36, and 38 that the cutting-chain of this embodiment is carried on a plurality of roller-bearings contained within the bar. Because of the equalized action of the chain and the angular stops, and because of the minimization of regions of curvature which are intermediate between the maximum and minimum curvatures of the chain, the profile of the tensioned chain is essentially fixed. The chain will, for example, readily span saw-bar roller bearings 318 without binding. A bearing band 316 of flexible material surrounds the roller bearings and retains them around the perimeter of the inner ply 320 of the saw-bar. Other functions of the bearing band beyond retention of the roller-bearings include the distribution of the tension of the chain, the maintenance of continuity of motion in the roller bearings, and the exclusion of dust and debris from the bearings and their associated surfaces.

The bar includes two outer plies. Roller-bearing saw-bar removable ply 330, similar in form to the first, is held in place with fasteners. Roller-bearing saw-bar fixed ply 330' is permanently attached to the center ply, for example by welding. Embossed ridges are formed in both outer plies which are inset from the curved perimeter of the saw-bar; each ridge is furthermore formed so as to be substantially equidistant from the perimeter at every point on its working length. Two chain-guide ridges 330a are disposed so that their convex surfaces nearly contact the outer links of the cutting-chain; the cutting-chain therefore contacts the bar only via the bearing band and in the region of these two convex ridges. This arrangement minimizes friction between all meeting surfaces. A further advantage is that the chain is supported much closer to the outermost perimeter of the chain; deflection of the chain from the plane of the saw-bar is minimized. As illustrated, the outermost ridges on the two outer plies leave a gap between them which is less than the length of the typical finished rivet; this configuration prevents the escape of the chain from the bar when the removable cover is in place; chain breakage thus can result only in the chain stalling within the saw-bar or being derailed into the plate-joiner housing, thereby further enhancing safety. Roller-bearing ridge 330b nearly contacts the circular end surfaces of the roller-bearings, and serves to reduce the frictional loading of the ends of the roller-bearings without added costs associated with chamfering or doming the ends of the individual bearings. The surface area of the embossed outer plies is furthermore locally increased in the region of the ridges, therefore the ridges dissipate heat at a greater rate than a conventional configuration of planar contact surfaces. Lubrication of the cutting-chain and bearings may be regularly effected via lubrication port 330c. The port may be provided with a fitting or plug to prevent contamination.

The series of ridges in the outer plies additionally stiffens the bar and discourages torsional deformation. Furthermore, the raised plateaus between the ridges are formed so the thickness of the bar in those regions is slightly less than the kerf formed by the cutter; the bar therefore closely follows the advancing cutting-chain and deters any twisting or wandering of the chain-saw as the cut progresses.

The formation and arrangement of the cutting-teeth may be best understood in reference to FIGS. 34 and 38. As shown, right and left paring teeth 310, 310' are alternated with right and left planing teeth 311, 311'. This configuration mimics the diverse cutting action of the chain illustrated in the first embodiment, and permits the chain-sawn recess to be formed with square corners, whereas the chain-saw tooth arrangement of the immediately preceding embodiment would typically leave a small fillet at the junctures of the end-wall and the side-walls of the recess.

Figure 37:
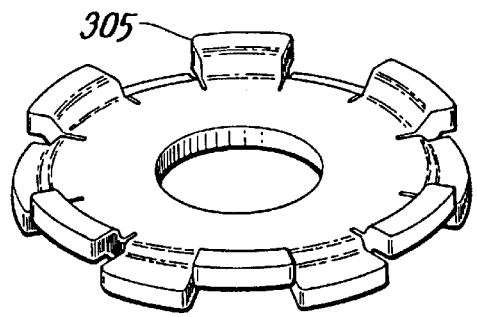
FIG. 37 illustrates a drive sprocket for use with a footed cutting-chain.

Footed internal links 313 may be understood most clearly in reference to FIGS. 35A and 35B. The base of a typical link includes two tabs which are bent outward in opposite directions to form leading foot 313a and trailing foot 313b. The feet are formed so that when a segment of the chain is disposed at the maximum radius of curvature, i.e. the shallowest allowed by the link structure, the regions at front and the rear of the footed links contact the bearing band. This situation may be seen in FIG. 34. The feet are furthermore formed so that when the chain is disposed at the minimum radius of curvature, e.g. at its most acute allowed by the link structure, the central region of the bent feet, i.e the trailing region of leading foot 313a and the leading region of trailing foot 313b contacts the bearing band. This is the situation shown in the links on the left-hand side of FIG. 38. A collateral benefit of this arrangement is that the alternating feet may be used to drivingly engage the cutting-chain with a drive-sprocket. Offset-toothed drive-sprocket 305 is illustrated in FIG. 37, and may be inexpensively formed of stamped metal. The outer perimeter of the sprocket-teeth bears against the outer cutting-chain teeth, while the leading edges of the sprocket teeth drive against the rear surfaces of the bent feet. An alternate, but similar, drive-sprocket may be formed by bonding two stacked, planar sprockets in an offset configuration.

Attributes in the footed chain similar to those of the preceding embodiment include pivot tooth 313a, pivot recess 313b, outer and inner trailing edge profiles 313e, 313e', outer and inner leading edge profiles 313f, 313f', and leading and trailing holes 313j, 313k. These profiles, which serve to arrest the articulation of the chain at the desired rates of curvature, are supported by a similar action in the specific configuration of analogous top profiles. As mentioned previously, the stamped links are bent so that they substantially cover the variable gaps between inner links; an additional function is served by this feature in that top of the internal links are shaped so as to bear against the undersides of these cutting-links at the predetermined extreme curvatures of the cutting-chain. This effect may be see in particular reference to FIG. 34, where top leading and trailing major radius profiles 313g, 313g' reinforce the stopping effect of end profiles 313e and 313f. Where the chain is locally arranged at its minor radius of curvature, i.e. at its most acute, top leading and trailing profiles 313h, 313h' perform a similar limiting function in support of profiles 313e' and 313f'. It may also be seen by reference to this figure that the ends of the tooth-links and connector-links in the outer layers are formed and assembled so that their ends mate in the same fashion as the internal links, and thereby reiterate the angle-limiting and equalizing action of the central layer.

Accordingly, it may be seen that the plate-joinery system of the present invention can be advantageously employed in many joinery situations where there is a demand for both high strength and speed of fabrication. Furthermore, the chain-saw plate-joiner has additional advantages in that: the range of joint types which may reliably be formed by a plate-joiner is broadened to include face-frames and many common furniture joints; the various modifications of the saw-bar permit a range of plate profiles to be elected; set-up and fabrication time is greatly reduced over existing methods of forming high-strength right-angle joints; and the deep engagement of the plates allows a single plate to be used where previously plates were necessarily doubled. Joints, especially three-way joints such as those connecting table aprons to table legs, may include, at each joint, plates of differing penetration, whereby joints of exceptional strength and durability may be formed. The option of self-closing draw-joints in combination with compressed wooden plates allows work to be assembled reliably and quickly without delays and without the labor, space, and fixture costs associated with conventional clamping. Self-closing joints allow furniture fabricated in accordance with the present invention to be transported, inventoried, or retailed in unassembled or partly-assembled form, whereby assembly may be completed by those having limited skills or experience. The self-closing draw-joints permit the convenient assembly of previously problematical coopered or staved joints, in which beveled edge-faces and their resulting faceted or curved surfaces make clamping notoriously difficult. The suitability of the system for use with repeated-use or temporary fastening devices allows new methods of constructing articles such as displays, shelving, beds, sawhorses, and outdoor furniture, which, due to their size or to the occasional or seasonal nature of their use, are expressly designed for assembly, disassembly, and reassembly.

Although the preceding descriptions include many specific details, these should not be construed as limiting the scope of the invention, but as merely providing illustrations of various embodiments. The plate-joiner may be driven by line power, single-use or rechargeable cells or batteries, compressed air, or internal combustion. The drive-shaft may be directly driven rather than rotated by a right-angle transmission. The transmission may include a variable-slip differential to minimize wear of motor or drive components. The power system may include means to vary the rate of rotation of the drive-shaft and thereby regulate the speed of the cutting-chain. The saw-bar may be incorporated in a sub-assembly which includes a drive-sprocket having a non-circular center-hole to fit on a drive-shaft of complementary shape, so that saw-bars may be rapidly switched or replaced; cutting-chains in such sub-assemblies may be prestressed and tensioned during manufacturing to guarantee accuracy. The system may readily be adapted to various bench-top or floor-standing stationary machines. The saw-bars may be ganged in either a colinear or coaxial manner so that multiple cuts may be made. Such cuts may be made either concurrently or in succession, and may differ in depth.

Embodiments of the invention may be employed in any field where there is a need for a controlled, safeguarded cutting device, including timber- or brush-cutting, lumber milling, construction, trim carpentry, remodeling, plumbing, masonry, locksmithing, rescue and firefighting. The cutting-chains described herein may be used in other stationary or portable devices such as cut-off saws, table saws, pruning saws, or for such operations as scoring, profile-cutting, slotting and grooving, and may be generally used to make safer or more compact versions of machines currently using rotary cutters. The invention may be employed in the cutting of composite material, aggregate resins, masonry, minerals, metals, and diverse sheet-goods as well as wood.

Teeth or links may include fused bimetallic material, ceramic, diamond or other cutting materials. Tooth designs and sequences are diverse, and often configured for specific applications, operational characteristics, or materials; tooth and link geometries and arrangements therefore may vary according to the cutting characteristics of the stock, chain speed, desired profile, or feed rate. The structures which limit the articulation and those which equalize the articulation of neighboring links may take diverse forms. While substantially planar examples of such structures have been shown, further embodiments may be readily envisioned in which these functions are served by bent or inclined tabs, dimples, ridges, and various other structural discontinuities sufficient to produce the desired regulation of pivotal movement. These actions may be induced between layers of links as well as within a single layer. The depictions of these attributes are therefore exemplary only.

The saw-bar may include additional plies to further seal the bearings. Captive ball-bearings may be entrapped by the chain links or retained within rivet-heads to further reduce friction where the chain bears against the saw-bar. The illustrated embodiments of the cutting-chain, while typically minimizing friction, do not preclude the concurrent use of such features such as lubrication channels, reservoirs, self-lubrication systems, heat radiators or dissipators, air circulation devices or other conventions familiar to those practiced in the art, but not specified in the figures. Roller, bushing and axle dimensions may be variously adjusted, depending upon the constituent materials, for example, to optimize performance and longevity. Where sintered materials are employed, sintering densities may be similarly optimized in accordance with conventional practice. Various roller-bearings or roller materials may be used, depending upon the cutting-chain's anticipated operating conditions and intended working-life, including ball-bearings, sealed bearings, solid bearings, PFTE-coated or PFTE-composite materials, dual or multiple coaxial sleeve arrangements employing components of monolithic or diverse composition. Contact surfaces of various components of the plate-joiner may be coated or otherwise treated to reduce friction and wear. Links may be locally treated, for example, to reduce wear or enhance cutting ability; the saw-bar may be locally hardened to extend its working life and coated to reduce chain friction or to ease its insertion into a plate-recess.

Embodiments of the present invention permit partial-thickness surface-cuts, and thus the systems' utility is intended to extend beyond the specific function of joinery. Current plate-joining practice includes hinge-mortising; because diverse saw-bar profiles may be used, the present invention greatly extends this function. The saw-bar may take the form of a rounded rectangle or polygon, in order, for example, to conform to a given article of hardware. Saw-bars may furthermore be asymmetrical or may possess geometries optimized for miter joints. Plates are not limited to the sizes, proportions, or functions shown and may include locksets or latches for drawers, cabinets, windows, and passageway doors, grips for drawers and doors, diverse hinges, as well as various other hardware components employed in the furniture, millwork, building and nautical trades. Draw-pins may be wood, metal, synthetic, or of mixed composition, and may be variously colored or ornamented; they may also be coated, collated or otherwise treated for rapid insertion using electrical or pneumatic installation tools. They may include flanges to arrest insertion, or ribs or barbs on their external surfaces to deter withdrawal. In production situations, where the orientation of the pins is less likely to be arbitrary, pins may be divided longitudinally on an oblique axis so that the may be inserted in halves, and so that the two halves ramp against one another and exert force on a draw-plate only in a predetermined direction. Plates having square holes may be employed with pins of similar transverse section; square holes may be formed in the work-piece using a hollow-chisel mortiser to mimic certain traditional styles of handwork. Draw-pins for use with frames may include hangers, so that mirrors or picture frames, for example, may be provided with integral mounting hardware.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

I claim:

1. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material;

a base that is slidably mounted to the plate to permit the plate to move relative to the base between a first position and a second position; and a depth stop that limits movement of the plate relative to the base to a plurality of third positions that are between the first and second positions;

wherein the base encloses the saw-bar and the cutting-chain in the first position, and wherein the base encloses only a portion of the saw-bar and the cutting-chain in the second position.

2. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material;

a base that is slidably mounted to the plate to permit the plate to move relative to the base between a first position and a second position; and a depth stop that limits movement of the plate relative to the base to at least one third position that is between the first and second positions;

wherein the base encloses the saw-bar and the cutting-chain in the first position, and wherein the base encloses only a portion of the saw-bar and the cutting-chain in the second position; and wherein the depth stop includes means for finely adjusting the at least one third position.

3. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material;

a base that is slidably mounted to the plate to permit the plate to move relative to the base between a first position and a second position; and a depth stop that limits movement of the plate relative to the base to at least one third position that is between the first and second positions;

wherein the base encloses the saw-bar and the cutting-chain in the first position, and wherein the base encloses only a portion of the saw-bar and the cutting-chain in the second position; and wherein the depth stop includes a sliding bolt.

4. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and a base that is slidably mounted to the plate to permit the plate to move relative to the base between a first position and a second position;

wherein the base encloses the saw-bar and the cutting-chain in the first position, and wherein the base encloses only a portion of the saw-bar and the cutting-chain in the second position; and wherein the plate includes at least one mounting feature that permits the plate to be mounted on a stationary stand.

5. The cutting saw of claim 4, wherein the at least one mounting features includes a pair of gear racks overhanging an edge of the plate and spaced apart from the shaft and the saw bar.

6. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and a base that is slidably mounted to the plate to permit the plate to move relative to the base between a first position and a second position;

wherein the base encloses the saw-bar and the cutting-chain in the first position, and wherein the base encloses only a portion of the saw-bar and the cutting-chain in the second position;

wherein the base has a forward edge and a rearward edge, the saw-bar and the cutting-chain being enclosed within the forward and rearward edges of the base when the plate is in the first position and only the portion of the saw-bar and the cutting-chain being enclosed within the forward and rearward edges of the base when the plate is in the second position, and wherein the forward edge of the base include an opening that permits the remaining portion of the saw-bar and the cutting-chain to protrude therethrough when the plate is in the second position; and wherein a rearward portion of the base that is proximate to the rearward edge includes a plurality of curved vanes that deflect the solid material removed by the at least one tooth in a predetermined direction.

7. The cutting saw of claim 6, wherein the plurality of curved vanes are spaced apart from each other by a distance that permits the solid material to be deflected out of the base without permitting the cutting-chain to be deflected out of the base if the cutting-chain breaks during operation.

8. A cutting saw, comprising:
a motor that induces rotary motion in a shaft;
a plate that is mounted to the shaft so that the shaft can be held stationary relative to the plate on all axes except a longitudinal axis of the shaft, whereby the shaft can be freely rotated about the longitudinal axis of the shaft;
an elongated saw-bar mounted to the plate, the saw-bar having a perimeter;
a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and
a base that is slidably mounted to the plate to permit the plate to move relative to the base between a first position and a second position;
wherein the base encloses the saw-bar and the cutting-chain in the first position, and wherein the base encloses only a portion of the saw-bar and the cutting-chain in the second position;
wherein the base has a forward edge and a rearward edge, the saw-bar and the cutting-chain being enclosed within the forward and rearward edges of the base when the plate is in the first position and only the portion of the saw-bar and the cutting-chain being enclosed within the forward and rearward edges of the base when the plate is in the second position, and wherein the forward edge of the base include an opening that permits the remaining portion of the saw-bar and the cutting-chain to protrude therethrough when the plate is in the second position; and
wherein the forward edge of the base includes a substantially planar reference face that is perpendicular to the saw-bar.

9. The cutting saw of claim 8, wherein the substantially planar reference face includes a plurality of raised surfaces to engage with a work-piece and prevent lateral displacement of the cutting saw when the planar reference face is place in contact with a surface of the work-piece.

10. The cutting saw of claim 9, wherein the plurality of raised surfaces include rubber friction pads.

11. The cutting saw of claim 8, further comprising a second substantially planar reference face that is mounted to the base proximate to the forward edge of the plate, so that the substantially planar reference face and the second substantially planar reference face may be abutted to distinct planar regions of a work-piece.

12. The cutting saw of claim 11, wherein the second substantially planar reference face is mounted to the base at a fixed angle relative to the substantially planar reference face.

13. The cutting saw of claim 12, wherein the fixed angle is 90 degrees.

14. The cutting saw of claim 12, wherein the fixed angle is 45 degrees.

15. The cutting saw of claim 11, wherein the second substantially planar reference face is adjustably mounted to the base so that an angle between the second substantially planar reference face and the substantially planar reference face can be altered.

16. The cutting saw of claim 11, further comprising an armature that is rigidly mounted to the base proximate to the forward edge of the plate, the armature being mounted parallel to the substantially planar reference face;
wherein the second substantially planar reference face is movably mounted to the armature so that the second substantially planar reference face can be moved toward and away from the substantially planar reference face along the armature.

17. The cutting saw of claim 16, wherein the second substantially planar reference is further movably mounted to the armature so that an angle between the second substantially planar reference face and the substantially planar reference face can be altered.

18. The cutting saw of claim 11, wherein the second substantially planar reference face includes a blade housing that conforms to a shape of the remaining portion of the saw-bar and the cutting-chain when the plate is in the second position.

19. The cutting saw of claim 18, wherein the blade housing includes a window that permits the saw-blade and the cutting-chain to be visible as the plate moves from the first position toward the second position.

20. A cutting saw, comprising:
a motor that induces rotary motion in a shaft;
a plate that is mounted to the shaft so that the shaft can be held stationary relative to the plate on all axes except a longitudinal axis of the shaft, whereby the shaft can be freely rotated about the longitudinal axis of the shaft;
an elongated saw-bar mounted to the plate, the saw-bar having a perimeter;
a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and
a base that is slidably mounted to the plate to permit the plate to move relative to the base between a first position and a second position;
wherein the base encloses the saw-bar and the cutting-chain in the first position, and wherein the base encloses only a portion of the saw-bar and the cutting-chain in the second position;
wherein the base has a forward edge and a rearward edge, the saw-bar and the cutting-chain being enclosed within the forward and rearward edges of the base when the plate is in the first position and only the portion of the saw-bar and the cutting-chain being enclosed within the forward and rearward edges of the base when the plate is in the second position, and wherein the forward edge of the base include an opening that permits the remaining portion of the saw-bar and the cutting-chain to protrude therethrough when the plate is in the second position; and
wherein the base includes at least one gate that is slidably disposed in the opening in the forward edge of the base, the gate being movable between a third position and a fourth position, the third position minimizing a size of the opening in the forward edge of the base and the fourth position maximizing the size of the opening in the forward edge of the base.

21. The cutting saw of claim 20, further comprising at least one linkage arm pivotally connected to the at least one gate and the plate that moves that at least one gate from the third position to the fourth position when the plate moves from the first position to the second position.

22. The cutting saw of claim 21, wherein the at least one gate has an outer surface that is coplanar with the forward edge of the base throughout its movement between the third position and the fourth position.

23. The cutting saw of claim 20, wherein the at least one gate slides between the third position and the fourth position just outside a path of the cutting-chain to minimize tear-out.

24. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and a base that is slidably mounted to the plate to permit the plate to move relative to the base between a first position and a second position;

wherein the base encloses the saw-bar and the cutting-chain in the first position, and wherein the base encloses only a portion of the saw-bar and the cutting-chain in the second position; and wherein an extended portion of the saw-bar and the cutting-chain that is not enclosed by the base when the plate is in the second position includes three geometrically distinct perimeter arcs, the three distinct perimeter arcs including a nose-arc and two side-arcs, the two side-arcs being equal to one another, opposite in orientation, positive in curvature, and substantially continuous with and substantially tangent to the nose-arc at points of connection between the three distinct perimeter arcs.

25. The cutting saw of claim 24, wherein a radius of the nose-arc is substantially one-quarter a radius of each of the two side-arcs.

26. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and a base that is slidably mounted to the plate to permit the plate to move relative to the base between a first position and a second position;

wherein the base encloses the saw-bar and the cutting-chain in the first position, and wherein the base encloses only a portion of the saw-bar and the cutting-chain in the second position;

wherein the motor includes a switch having a first state that permits the motor to induce rotary motion in the shaft and a second state that prevents the motor from inducing rotary motion in the shaft;

wherein the base includes an upper base and a lower base that are mechanically coupled together to form the base; and wherein separation of the upper base from the lower base sets the switch to the second state.

27. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material;

a base that is slidably mounted to the plate to permit the plate to move relative to the base between a first position and a second position; and a plurality of freely-turning bearings interposed between the cutting chain and the saw-bar, so that when tension is introduced between the cutting chain and the saw-bar, a majority of the tension is borne by the bearings;

wherein the base encloses the saw-bar and the cutting-chain in the first position, and wherein the base encloses only a portion of the saw-bar and the cutting-chain in the second position.

28. The cutting saw of claim 27, wherein the plurality of freely-turning bearings is retained on the cutting chain.

29. The cutting saw of claim 27, wherein the plurality of freely-turning bearings is retained on the saw-bar.

30. The cutting saw of claim 27, further comprising:

a flexible bearing band surrounding each of the plurality of freely-turning bearings, that retains the plurality of freely-turning bearings about the perimeter of the saw-bar.

31. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and a base that is slidably mounted to the plate to permit the plate to move relative to the base between a first position and a second position;

wherein the base encloses the saw-bar and the cutting-chain in the first position, and wherein the base encloses only a portion of the saw-bar and the cutting-chain in the second position; and wherein the cutting-chain includes a plurality of links including a first link and a second link, the first link having a leading edge and the second link having a trailing edge, and wherein the leading edge of the first link and the trailing edge of the second link have complementary mating surfaces, the complementary mating surfaces inducing articulation between the first link and the second link as the cutting-chain rotates about the perimeter of the saw-bar.

32. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and a base that is slidably mounted to the plate to permit the plate to move relative to the base between a first position and a second position;

wherein the base encloses the saw-bar and the cutting-chain in the first position, and wherein the base encloses only a portion of the saw-bar and the cutting-chain in the second position; and wherein the complementary mating surfaces of the leading edge of the first link and the trailing edge of the second link include at least one recess and at least one protrusion.

33. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and a base that is slidably mounted to the plate to permit the plate to move relative to the base between a first position and a second position;

wherein the base encloses the saw-bar and the cutting-chain in the first position, and wherein the base encloses only a portion of the saw-bar and the cutting-chain in the second position; and wherein the cutting-chain includes a plurality of successive links, each respective link of the plurality of successive links including a first stop that prevents articulation between the respective link and the immediately preceding link greater than a predetermined radius.

34. The cutting chain of claim 33, wherein each respective link of the plurality of successive links includes a second stop that prevents articulation between the respective link and an immediately following link greater than the predetermined radius.

35. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

an elongated saw-bar mounted to the plate, the saw-bar having a perimeter;

a cutting-chain entrained about the perimeter of the saw-bar and about the shaft so that rotation of the shaft induces rotary motion of the cutting-chain about the perimeter of the saw-bar, the cutting-chain including at least one tooth that is capable of removing solid material; and a plurality of freely-turning bearings interposed between the cutting chain and the saw-bar, so that when tension is introduced between the cutting chain and the saw-bar, a majority of the tension is borne by the bearings.

36. The cutting saw of claim 35, wherein the plurality of freely-turning bearings is retained on the cutting chain.

37. The cutting saw of claim 35, wherein the plurality of freely-turning bearings is retained on the saw-bar.

38. The cutting saw of claim 35, wherein the cutting-chain includes a plurality of links including a first link and a second link, the first link having a leading edge and the second link having a trailing edge, and wherein the leading edge of the first link and the trailing edge of the second link have complementary mating surfaces, the complementary mating surfaces inducing articulation between the first link and the second link as the cutting-chain rotates about the perimeter of the saw-bar.

39. The cutting saw of claim 35, wherein the cutting-chain includes a plurality of successive links, each respective link of the plurality of successive links including a first stop that prevents articulation between the respective link and the immediately preceding link greater than a predetermined radius.

40. A cutting saw, comprising:

a motor that induces rotary motion in a shaft;

a plate that is mounted to the shaft so that the shaft can be held stationary relative to the plate on all axes except a longitudinal axis of the shaft, whereby the shaft can be freely rotated about the longitudinal axis of the shaft;

at least one cutting-tooth mounted about the shaft so that rotation of the shaft rotates the at least one cutting-tooth about the shaft;

a base that is slidably mounted to the plate to permit the plate to move relative to the base between a first position and a second position, the base having a forward edge with an opening through which the at least one cutting-tooth can protrude, the at least one cutting-tooth being enclosed by the base within the forward edge in the first position and extending beyond the forward outside the base through the opening in the second position; and at least one gate slidably disposed in the opening in the forward edge of the base, the gate being movable between a third position and a fourth position, the third position minimizing a size of the opening in the forward edge of the base and the fourth position maximizing the size of the opening in the forward edge of the base.

41. The cutting saw of claim 40, further comprising at least one linkage arm pivotally connected to the at least one gate and the plate that moves that at least one gate from the third position to the fourth position when the plate moves from the first position to the second position.

42. The cutting saw of claim 40, wherein the at least one gate has an outer surface that is coplanar with the forward edge of the base throughout its movement between the third position and the fourth position.

43. The cutting saw of claim 40, wherein the at least one gate slides between the third position and the fourth position just outside a path of the cutting-chain to minimize tear-out.

* * * * *